United States Patent
Elliott et al.

(10) Patent No.: US 11,445,523 B2
(45) Date of Patent: Sep. 13, 2022

(54) SCHEDULING COMMUNICATIONS IN A WIRELESS NETWORK

(71) Applicant: III Holdings 1, LLC, Wilmington, DE (US)

(72) Inventors: Brig Barnum Elliott, Arlington, MA (US); David Spencer Pearson, Bennington, VT (US)

(73) Assignee: III Holdings 1, LLC, Wilmington, DE (US)

( * ) Notice: Subject to any disclaimer, the term of this patent is extended or adjusted under 35 U.S.C. 154(b) by 51 days.

(21) Appl. No.: 17/114,624

(22) Filed: Dec. 8, 2020

(65) Prior Publication Data

US 2021/0120567 A1    Apr. 22, 2021

Related U.S. Application Data

(63) Continuation of application No. 16/807,311, filed on Mar. 3, 2020, now Pat. No. 10,863,528, which is a
(Continued)

(51) Int. Cl.
*H04W 72/12*    (2009.01)
*H04W 56/00*    (2009.01)
(Continued)

(52) U.S. Cl.
CPC ........... *H04W 72/1205* (2013.01); *H04J 3/16* (2013.01); *H04W 56/00* (2013.01);
(Continued)

(58) Field of Classification Search
CPC ............. H04W 72/1205; H04W 56/00; H04W 72/1278; H04W 52/0216; H04W 52/0219; H04W 84/18; H04J 3/16; Y02D 30/70
See application file for complete search history.

(56) References Cited

U.S. PATENT DOCUMENTS 3,192,230 A    6/1965  Lunsford et al.
5,117,430 A *  5/1992  Berglund ................ H04L 12/44
                                                      370/408
(Continued)

FOREIGN PATENT DOCUMENTS

EP    1 022 876    7/2000
EP    1 102 454    5/2001
(Continued)

OTHER PUBLICATIONS

Amendment to Contract No. N3998-96-C-5021 (1997).
(Continued)

*Primary Examiner* — Julio R Perez
(74) *Attorney, Agent, or Firm* — Volpe Koenig

(57) ABSTRACT

A wireless device is configured to receive scheduling information at a predetermined time interval from a wireless node. The scheduling information includes a plurality of reception definitions. Each reception definition indicates a reception start time, a reception duration, and assigned frequency information. Each reception definition is derived from a wireless device identification associated with the reception definition. The wireless device is configured to receive data associated with at least one of the reception definitions.

16 Claims, 26 Drawing Sheets

Related U.S. Application Data continuation of application No. 15/409,055, filed on Jan. 18, 2017, now Pat. No. 10,588,139, which is a continuation of application No. 14/538,563, filed on Nov. 11, 2014, now Pat. No. 9,674,858, which is a continuation of application No. 12/537,085, filed on Aug. 6, 2009, now abandoned, which is a continuation of application No. 12/253,130, filed on Oct. 16, 2008, now Pat. No. 7,979,096, which is a continuation of application No. 12/174,512, filed on Jul. 16, 2008, now Pat. No. 7,623,897, which is a continuation of application No. 10/328,566, filed on Dec. 23, 2002, now Pat. No. 7,421,257.

(51) Int. Cl.
  *H04J 3/16* (2006.01)
  *H04W 84/18* (2009.01)
  *H04W 52/02* (2009.01)

(52) U.S. Cl.
  CPC .... *H04W 72/1278* (2013.01); *H04W 52/0216* (2013.01); *H04W 52/0219* (2013.01); *H04W 84/18* (2013.01); *Y02D 30/70* (2020.08)

(56) References Cited

U.S. PATENT DOCUMENTS

| | | | |
|---|---|---|---|
| 5,247,285 A | 9/1993 | Yokota et al. | |
| 5,297,142 A | 3/1994 | Paggeot et al. | |
| 5,307,297 A | 4/1994 | Iguchi et al. | |
| 5,371,734 A | 12/1994 | Fischer et al. | |
| 5,371,764 A | 12/1994 | Gillingham et al. | |
| 5,481,265 A | 1/1996 | Russell | |
| 5,515,369 A | 5/1996 | Flammer, III et al. | |
| 5,517,505 A | 5/1996 | Buchholz et al. | |
| 5,528,587 A | 6/1996 | Garland et al. | |
| 5,541,912 A | 7/1996 | Choudhury et al. | |
| 5,583,866 A * | 12/1996 | Vook | H04L 12/1877 |
| | | | 370/312 |
| 5,598,419 A | 1/1997 | Weigand et al. | |
| 5,602,841 A | 2/1997 | Lebizay et al. | |
| 5,604,735 A | 2/1997 | Levinson et al. | |
| 5,649,119 A | 7/1997 | Kondoh et al. | |
| 5,680,768 A | 10/1997 | Park | |
| 5,696,765 A | 12/1997 | Safadi | |
| 5,699,357 A | 12/1997 | Carvey | |
| 5,721,733 A | 2/1998 | Wang et al. | |
| 5,737,328 A | 4/1998 | Norman et al. | |
| 5,752,202 A | 5/1998 | Obright | |
| 5,781,028 A | 7/1998 | Decuir | |
| 5,832,492 A | 11/1998 | Wooten | |
| 5,848,064 A | 12/1998 | Cowan | |
| 5,857,080 A | 1/1999 | Jander et al. | |
| 5,896,375 A | 4/1999 | Dent et al. | |
| 5,903,777 A | 5/1999 | Brief | |
| 5,909,183 A | 6/1999 | Borgstahl et al. | |
| 5,933,611 A | 8/1999 | Shakkarwar | |
| 5,940,771 A * | 8/1999 | Gollnick | G08C 17/02 |
| | | | 455/343.2 |
| 5,974,327 A | 10/1999 | Agrawal et al. | |
| 6,005,854 A | 12/1999 | Xu et al. | |
| 6,005,869 A | 12/1999 | Sakai et al. | |
| 6,011,486 A | 1/2000 | Casey | |
| 6,011,784 A | 1/2000 | Brown et al. | |
| 6,026,297 A | 2/2000 | Haartsen | |
| 6,028,857 A | 2/2000 | Poor | |
| 6,052,779 A | 4/2000 | Jackson et al. | |
| 6,061,687 A | 5/2000 | Wooten | |
| 6,067,301 A | 5/2000 | Aatresh | |
| 6,069,896 A | 5/2000 | Borgstahl et al. | |
| 6,079,033 A | 6/2000 | Jacobson, Jr. et al. | |
| 6,094,435 A | 7/2000 | Hoffman et al. | |
| 6,097,707 A | 8/2000 | Hodzic et al. | |
| 6,097,733 A | 8/2000 | Basu et al. | |
| 6,115,390 A | 9/2000 | Chuah | |
| 6,128,290 A | 10/2000 | Carvey | |
| 6,128,492 A | 10/2000 | Chung | |
| 6,192,230 B1 | 2/2001 | Van Bokhorst et al. | |
| 6,208,247 B1 * | 3/2001 | Agre | G01V 1/223 |
| | | | 340/854.6 |
| 6,249,740 B1 | 6/2001 | Ito et al. | |
| 6,256,682 B1 | 7/2001 | Gudan et al. | |
| 6,272,140 B1 | 8/2001 | La Rowe et al. | |
| 6,272,567 B1 | 8/2001 | Pal et al. | |
| 6,279,060 B1 | 8/2001 | Luke et al. | |
| 6,282,183 B1 | 8/2001 | Harris et al. | |
| 6,292,508 B1 | 9/2001 | Hong et al. | |
| 6,314,091 B1 | 11/2001 | La Rowe et al. | |
| 6,331,972 B1 | 12/2001 | Harris et al. | |
| 6,351,468 B1 | 2/2002 | La Rowe et al. | |
| 6,381,467 B1 | 4/2002 | Hill et al. | |
| 6,385,174 B1 * | 5/2002 | Li | H04W 28/06 |
| | | | 370/252 |
| 6,414,955 B1 | 7/2002 | Clare et al. | |
| 6,415,342 B1 | 7/2002 | Wahl et al. | |
| 6,421,347 B1 | 7/2002 | Borgstahl et al. | |
| 6,424,623 B1 | 7/2002 | Borgstahl et al. | |
| 6,434,158 B1 | 8/2002 | Harris et al. | |
| 6,434,159 B1 | 8/2002 | Woodward et al. | |
| 6,487,180 B1 | 11/2002 | Borgstahl et al. | |
| 6,492,904 B2 | 12/2002 | Richards et al. | |
| 6,505,052 B1 | 1/2003 | Jou | |
| 6,532,220 B1 | 3/2003 | Carneal et al. | |
| 6,535,947 B1 | 3/2003 | Amoni et al. | |
| 6,564,074 B2 | 5/2003 | Romans | |
| 6,570,857 B1 | 5/2003 | Haartsen et al. | |
| 6,574,266 B1 | 6/2003 | Haartsen | |
| 6,574,453 B1 | 6/2003 | Honda et al. | |
| 6,590,928 B1 | 7/2003 | Haartsen | |
| 6,593,768 B1 | 7/2003 | Iyer et al. | |
| 6,633,538 B1 | 10/2003 | Tanaka et al. | |
| 6,633,753 B1 | 10/2003 | Kido | |
| 6,694,149 B1 * | 2/2004 | Ady | H04L 47/50 |
| | | | 455/420 |
| 6,697,649 B1 | 2/2004 | Bennett et al. | |
| 6,704,293 B1 | 3/2004 | Larsson et al. | |
| 6,715,071 B2 | 3/2004 | Ono et al. | |
| 6,721,273 B1 | 4/2004 | Lyon | |
| 6,748,451 B2 | 6/2004 | Woods et al. | |
| 6,754,188 B1 | 6/2004 | Garahi et al. | |
| 6,760,584 B2 | 7/2004 | Jou | |
| 6,775,258 B1 | 8/2004 | Van Valkenburg et al. | |
| 6,789,196 B1 | 9/2004 | Miyano | |
| 6,804,232 B1 | 10/2004 | Donaghey | |
| 6,807,163 B1 | 10/2004 | Shi | |
| 6,816,460 B1 | 11/2004 | Ahmed et al. | |
| 6,816,510 B1 | 11/2004 | Banerjee | |
| 6,842,430 B1 * | 1/2005 | Melnik | H04L 45/00 |
| | | | 370/254 |
| 6,901,465 B2 | 5/2005 | Kamihara et al. | |
| 6,977,895 B1 | 12/2005 | Shi et al. | |
| 7,020,501 B1 * | 3/2006 | Elliott | H04W 52/0216 |
| | | | 455/343.4 |
| 7,020,701 B1 | 3/2006 | Gelvin et al. | |
| 7,035,240 B1 * | 4/2006 | Balakrishnan | H04W 84/18 |
| | | | 709/224 |
| 7,218,633 B2 | 5/2007 | Donaghey | |
| 7,266,085 B2 * | 9/2007 | Stine | H04W 52/0219 |
| | | | 370/461 |
| 7,386,003 B1 | 6/2008 | Donaghey | |
| 7,421,257 B1 | 9/2008 | Elliott | |
| 7,653,394 B2 * | 1/2010 | McMillin | H04L 45/00 |
| | | | 370/331 |
| 9,674,858 B2 * | 6/2017 | Elliott | H04J 3/16 |
| 10,863,528 B2 * | 12/2020 | Elliott | H04W 56/00 |
| 2001/0029178 A1 | 10/2001 | Criss et al. | |
| 2002/0027894 A1 | 3/2002 | Arrakoski et al. | |
| 2002/0071395 A1 | 6/2002 | Redi et al. | |
| 2002/0082035 A1 | 6/2002 | Aihara et al. | |
| 2002/0184385 A1 | 12/2002 | Kato | |
| 2003/0012168 A1 | 1/2003 | Elson et al. | |

(56) References Cited

U.S. PATENT DOCUMENTS

| | | | |
|---|---|---|---|
| 2003/0066090 A1 | 4/2003 | Traw et al. | |
| 2003/0119568 A1 | 6/2003 | Menard | |
| 2003/0146871 A1 | 8/2003 | Karr et al. | |
| 2004/0196784 A1 | 10/2004 | Larsson et al. | |
| 2005/0215280 A1* | 9/2005 | Twitchell, Jr. | G06K 7/10079 |
| | | | 455/73 |
| 2006/0121861 A1* | 6/2006 | Diepstraten | H04L 7/04 |
| | | | 455/130 |
| 2006/0246869 A1 | 11/2006 | Ohlenbusch et al. | |
| 2017/0135122 A1* | 5/2017 | Elliott | H04W 72/1205 |
| 2020/0205172 A1* | 6/2020 | Elliott | H04W 56/00 |

FOREIGN PATENT DOCUMENTS

| | | | |
|---|---|---|---|
| EP | 1995923 A1 * | 11/2008 | H04J 3/0667 |
| WO | 96/14697 | 5/1996 | |
| WO | 99/14898 | 3/1999 | |
| WO | 00/68811 | 11/2000 | |
| WO | 05/005126 | 1/2005 | |

OTHER PUBLICATIONS

Barber et al., "Designing for Wireless LAN Communications," IEEE Circuits and Devices, 4:12, pp. 29-33 (1996).

Barber, Jr., Paper submitted to MIT. BodyLAN ™: A Low-Power Communications System (Feb. 1996).

Bers, A Body Model Server for Human Motion Capture and Representation, Presence, vol. 5, No. 4, pp. 381-392 (Fall 1996).

Boch, High Bandwidth MM-Wave Indoor Wireless Local Area Networks, Microwave Journal, pp. 152, 154-158 (Jan. 1996).

Butterfly Wireless Connectivity for Interactive Multimedia, Spec Sheet, Butterfly Communications, Inc. (1997).

Butterfly Wireless RF Solution, Spec Sheet, Butterfly Communications, Inc. (Nov. 1997).

Carvey, "Technology for the Wireless Interconnection of Wearable Personal Electronic Accessories," VLSI Signal Processing IX, pp. 13-22 (1996).

Clare et al., "Self-Organizing Distributed Sensor Networks," University of California Los Angeles/Rockwell Science Center, 9 pp. (Mar. 7, 2001).

Contract No. N3998-96-C-5021 (1996).

Notice of Allowance, U.S. Appl. No. 09/535,591, dated Feb. 10, 2004.

Notice of Allowance, U.S. Appl. No. 09/536,191, dated Feb. 6, 2008.

Notice of Allowance, U.S. Appl. No. 09/998,946, dated Oct. 26, 2005.

Notice of Allowance, U.S. Appl. No. 10/328,566, dated May 15, 2008.

Notice of Allowance, U.S. Appl. No. 10/894,406, dated Dec. 27, 2006.

Notice of Allowance, U.S. Appl. No. 12/174,512 dated Oct. 7, 2009.

Notice of Allowance, U.S. Appl. No. 12/253,130, dated Apr. 15, 2011.

Notice of Allowance, U.S. Appl. No. 12/537,010 dated Apr. 18, 2011.

Notice of Allowance, U.S. Appl. No. 14/538,563, dated Feb. 1, 2017.

Office Action Summary (Final Rejection), U.S. Appl. No. 14/538,563, dated Oct. 22, 2015.

Office Action Summary, U.S. Appl. No. 09/535,591, dated Sep. 10, 2003.

Office Action Summary, U.S. Appl. No. 09/536,191, dated Dec. 15, 2004.

Office Action Summary, U.S. Appl. No. 09/536,191, dated Jun. 29, 2005.

Office Action Summary, U.S. Appl. No. 09/536,191, dated Oct. 17, 2005.

Office Action Summary, U.S. Appl. No. 09/536,191, dated Feb. 6, 2007.

Office Action Summary, U.S. Appl. No. 09/536,191, dated Aug. 7, 2007.

Office Action Summary, U.S. Appl. No. 09/998,946, dated Oct. 5, 2004.

Office Action Summary, U.S. Appl. No. 09/998,946, dated May 18, 2005.

Office Action Summary, U.S. Appl. No. 10/328,566, dated Jun. 29, 2005.

Office Action Summary, U.S. Appl. No. 10/328,566, dated Jan. 12, 2006.

Office Action Summary, U.S. Appl. No. 10/328,566, dated Apr. 21, 2006.

Office Action Summary, U.S. Appl. No. 10/328,566, dated Oct. 18, 2006.

Office Action Summary, U.S. Appl. No. 10/328,566, dated Jun. 15, 2007.

Office Action Summary, U.S. Appl. No. 10/328,566, dated Dec. 13, 2007.

Office Action Summary, U.S. Appl. No. 10/649,030, dated Nov. 16, 2007.

Office Action Summary, U.S. Appl. No. 10/786,335, dated Nov. 2, 2007.

Office Action Summary, U.S. Appl. No. 10/894,406, dated Oct. 21, 2005.

Office Action Summary, U.S. Appl. No. 12/174,512 dated Mar. 9, 2009.

Office Action Summary, U.S. Appl. No. 12/253,130, dated Dec. 29, 2010.

Office Action Summary, U.S. Appl. No. 12/253,130, dated Jun. 29, 2009.

Office Action Summary, U.S. Appl. No. 12/253,130, dated Nov. 30, 2009.

Office Action Summary, U.S. Appl. No. 12/253,130, dated Mar. 31, 2010.

Office Action Summary, U.S. Appl. No. 12/537,085, dated Feb. 1, 2011.

Office Action Summary, U.S. Appl. No. 12/537,010, dated May 28, 2010.

Office Action Summary, U.S. Appl. No. 12/537,085, dated May 14, 2010.

Office Action Summary, U.S. Appl. No. 12/537,010, dated Dec. 21, 2010.

Office Action Summary, U.S. Appl. No. 12/537,085, dated Jan. 3, 2012.

Office Action Summary, U.S. Appl. No. 12/537,085, dated Dec. 20, 2012.

Office Action Summary, U.S. Appl. No. 14/538,563, dated Mar. 12, 2015.

Office Action Summary, U.S. Appl. No. 14/538,563, dated Jun. 27, 2016.

Doherty, "Algorithms for Position and Data Recovery in Wireless Sensor Networks," University of California at Berkeley, 54 pp. (Mar. 7, 2001).

Draft, An Introduction to USB 2.0—Draft 0.9 (1999).

Final Rejection, U.S. Appl. No. 15/409,055, dated Mar. 29, 2019.

Goyal et al., "MCM Design Methodology for Portable Wireless Communications Systems Design," Proceedings of the SPIE, vol. 2794, pp. 230-233 (1996).

Iyer—Intel Corporation, USB Engineering Change Notice—USB Cable Parameters, USB Specification Rev. 1.1 (Oct. 7, 1999).

Kardach, "Bluetooth Architecture Overview," Intel Corporation, 1998.

LaRowe, "PAN Feasibility: The BodyLAN Experience," GTE Internetworking—BBN Technologies (Mar. 1998).

Liu et al., "Simulation Modeling of Large-Scale Ad-hoc Sensor Networks," European Simulation Interoperability Workshop, University of Westminster, London, 12 pp. (Jun. 25-27, 2001).

Liu et al., Bluetooth Scatternet Route Structure for Multihop Ad Hoc Networks, IEEE Journal on Selected Areas in Communications, 21:2, pp. 229-239 (Feb. 2003).

(56) References Cited

OTHER PUBLICATIONS

Navarro, Simulation of Heterogeneous Optical Channel for Indoor Wireless Infrared Communications, Proceedings of Melecon '96, pp. 1035-1038 (May 1996).
Non-Final Rejection, U.S. Appl. No. 15/409,055, dated Nov. 17, 2017.
Non-Final Rejection, U.S. Appl. No. 15/409,055, dated Sep. 20, 2018.
Non-Final Rejection, U.S. Appl. No. 16/807,311, dated Apr. 2, 2020.
Notice of Allowance, U.S. Appl. No. 15/409,055, dated Oct. 28, 2019.
Notice of Allowance, U.S. Appl. No. 16/807,311, dated Sep. 30, 2020.
Retrieved Feb. 9, 2006 from http://www.unf.edu/ccec/ieee/prev_mesa_1998.html 1998 IEEE Computer Elements MESA Workshop (1998).
Retrieved Feb. 9, 2006 from http://www.wlan01.wpi.edu/scripts/history.html—The Third IEEE Workshop on Wireless LANs: History.
Retrieved from http://www.nap.edu 1997 Energy Efficient Technologies for the Dismounted Soldier, pp. 65-111 (1997).
Specification of the Bluetooth System, vol. I (Dec. 1, 1999).
Specification of the Bluetooth System, vol. II (Dec. 1, 1999).
U.S. Appl. No. 12/174,512, filed Jul. 16, 2008.
U.S. Appl. No. 12/537,010, filed Aug. 6, 2009.
U.S. Appl. No. 12/537,085, filed Aug. 6, 2009.
U.S. Appl. No. 12/699,836, filed Feb. 3, 2010.
U.S. Appl. No. 12/699,842, filed Feb. 3, 2010.
U.S. Appl. No. 12/699,846, filed Feb. 3, 2010.
Universal Serial Bus Specification 2.0 (Apr. 2000).
Universal Serial Bus Specification 2.0 (draft 0.79), p. 151 (Oct. 5, 1999).
Universal Serial Bus Specification, Revision 1.1, Compaq, Intel, Microsoft, NEC (Sep. 23, 1998).
Universal Serial Bus: Plug-and-Play C Single PC (Part 1 of 2); Technical Perspective, www.cypress.com/design/techarticles/v3n1p4.html (Aug. 16, 1999).
Universal Serial Bus: Plug-and-Play Connectivity for Multiple Peripherals on Single PC (Part 2 of 2); Technical Perspective, www.cypress.com/design/techarticles/v3n1p5.html (Aug. 16, 1999).
Van Dyck, Distributed Sensor Processing Over an Ad Hoc Wireless Network: Simulation Framework and Performance Criteria, NIST (2001).

\* cited by examiner

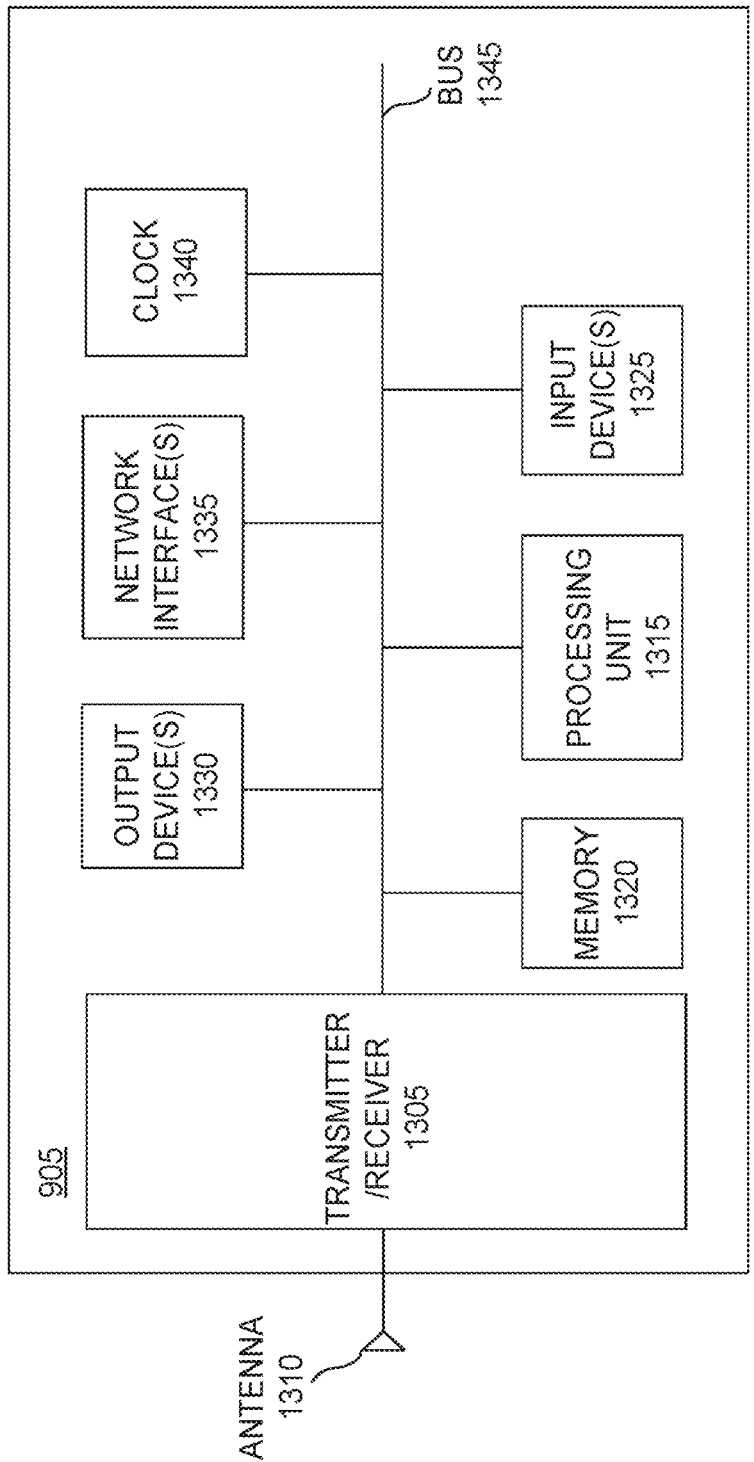

SCHEDULING COMMUNICATIONS IN A WIRELESS NETWORK

CROSS REFERENCE TO RELATED APPLICATIONS

This application is a continuation of U.S. patent application Ser. No. 16/807,311 filed Mar. 3, 2020, which is a continuation of U.S. patent application Ser. No. 15/409,055 filed Jan. 18, 2017, which is a continuation of U.S. patent application Ser. No. 14/538,563 filed Nov. 11, 2014, now U.S. Pat. No. 9,674,858, which is a continuation of U.S. patent application Ser. No. 12/537,085 filed Aug. 6, 2009, which is a continuation of U.S. patent application Ser. No. 12/253,130 filed Oct. 16, 2008, now U.S. Pat. No. 7,979,096, which is a continuation of U.S. patent application Ser. No. 12/174,512 filed Jul. 16, 2008, now U.S. Pat. No. 7,623,897, which is a continuation of U.S. patent application Ser. No. 10/328,566 filed Dec. 23, 2002, now U.S. Pat. No. 7,421,257, the entire contents of which are incorporated herein by reference.

BACKGROUND

A. Field of the Invention

The present invention relates generally to wireless communications networks and, more particularly, to receiver scheduling in ad hoc wireless communications networks. The present invention also relates generally to ad-hoc, multi-node wireless networks and, more particularly, to systems and methods for implementing energy efficient data forwarding mechanisms in such networks.

B. Description of the Related Art

Conventionally, an ad hoc wireless network includes a variable number of communications nodes, each node being equipped with a communications transceiver for conveying information messages throughout the network. While some nodes in the network are capable of performing network routing functions, other nodes serve exclusively as sources or destinations for data traffic. These two types of nodes are commonly referred to, respectively, as routers and endpoints. During network operation, these routers and endpoints execute predefined algorithms and adhere to established networking protocols, which together enable the nodes to find one another, determine preferred paths through the network for data traffic, and detect and repair ruptures in the network as communication path characteristics change over time, or as nodes move, fail, experience changes in battery power, etc.

Certain ad hoc wireless networks employ a scheme known as receiver scheduling to conserve power in some or all of the network nodes, or to make it more difficult for adversaries (e.g., hackers in a civilian context, or enemies in a military context) to monitor and disrupt network operation. In such receiver scheduling schemes, node receivers are selectively and intermittently turned off for some fraction of the total time that the overall network is operational. Consequently, each node is available and operating to receive information messages only during prescribed periods, and some form of receiver scheduling is employed to ensure that the various network nodes are in agreement as to when they can transmit information messages to one another.

Conventionally, receiver scheduling is accomplished using some form of Time Division Multiple Access, or TDMA, plan. While there are many variants of TDMA receiver scheduling, all such schemes share a common basic principle. Specifically, such TDMA plans divide network operating time into a number of predefined time slots and, during each time slot, certain network nodes are appointed to power up their receivers to accept incoming information messages. By sharing a common reference clock, as well as a common receiver appointment schedule, all of the nodes in the network are informed as to when they are able to successfully transmit messages to neighboring nodes.

Typically, all of the nodes in such a network are preconfigured with a single, network-encompassing TDMA receiver schedule. Alternatively, each node can transmit its own particular TDMA receiver schedule to other nodes during network operation. For example, a node can generate its own TDMA receiver schedule at run time using a pseudo-random number generator, or PRNG, and then transmit a corresponding PRNG seed to neighboring nodes (since, assuming all nodes are in agreement as to how to construct a TDMA receiver schedule from a PRNG stream, a single PRNG seed unambiguously defines a unique TDMA receiver schedule).

While these methods do achieve the stated goal of providing receiver scheduling in ad hoc wireless networks, they also have certain drawbacks. For example, in each of the above mentioned TDMA schemes, the start times and durations of the TDMA time slots are fixed. Consequently, each node is restricted with respect to the start times and durations of its reception intervals. Such rigidity inevitably results in inefficiencies, as message transmission intervals are not always precise multiples of a time slot, and thus portions of time slots sometimes go unused. Moreover, the fixed nature of the time slots can aid adversaries in attempts to monitor and disrupt network operation (i.e., the start times and durations of the time slots are not variables with which an adversary must contend). As a result, a need exists for a more flexible, efficient, and robust receiver scheduling scheme.

Recently, much research has been directed towards the building of networks of distributed wireless sensor nodes. Sensor node in such networks conduct measurements at disturbed location and relay the measurements, via other senor node in the network, to one or more measurement data collection points. Sensor networks, generally, are envisioned as encompassing a large number (N) of sensor nodes (e.g., as many as tens of thousands of sensor nodes), with traffic flowing from the sensor node into a much smaller number (K) of measurement data collection points using routing protocols. These routing protocols conventionally involve the forwarding of routing information necessary for sensor nodes to relay measurements to an appropriate measurement data collection point.

A key problem with conventional sensor networks is that each sensor node of the network operates for extended periods of time on self-contained power supplies (e.g., batteries or fuel cells). For the routing protocols of the sensor network to operate properly, each sensor node must be prepared to receive and forward routing packets at any time. Each sensor node's transmitter and receiver, thus, conventionally operates in a continuous fashion to enable the sensor node to receive and forward the routing packets essential for relaying measurements from a measuring sensor node to a measurement data collection point in the network. This continuous operation depletes each node's power supply reserves and, therefore, limits the operational life of each of the sensor nodes.

Therefore, there exists a need for mechanism in a wireless sensor network that enable the reduction of sensor node power consumption while, at the same time, permitting the reception and forwarding of the packets necessary to implement a distributed wireless network.

SUMMARY

Systems and methods consistent with the present invention address this and other needs by having nodes in an ad hoc wireless network continually generate and broadcast next, or pending, portions of their respective receiver schedules.

In accordance with the purpose of the invention as embodied and broadly described herein, a wireless network includes a node that periodically generates and transmits at least one reception definition. Each reception definition indicates a time and manner in which the node will be available and operating to receive information messages.

In another implementation consistent with the present invention, a node including a memory and a processor is disclosed. The processor generates a local receiver schedule including a number of reception definitions, periodically modifies the local receiver schedule, and transmits the prevailing local receiver schedule together with information messages bound for other nodes in the network.

In yet another implementation consistent with the present invention, a method for performing receiver scheduling at a node in a wireless network is disclosed. The method includes generating a local receiver schedule at the node, the local receiver schedule including a number of reception definitions. Each reception definition indicates a time and manner in which the node will operate to receive information messages from other nodes in the network. The method further includes periodically updating the local receiver schedule at the node, and periodically transmitting a most recently updated local receiver schedule from the node to other nodes in the network.

Systems and methods consistent with the present invention address this need and other by providing mechanisms that enable sensor node transmitters and receivers to be turned off, and remind in a "sleep" state, for substantial periods, this, increasing the energy efficient of the nodes. Systems and methods consistent with the present invention further implement transmission and reception schedules that permit the reception and forwarding of packet containing routing, or other types of data, during short periods when the sensor node transmitters and receivers are powered up and, thus, "awake" The present invention, this increase sensor node operational life by reducing energy consumption while permitting the reception and forwarding of the routing messages needed to self-organize the distributed network.

In accordance with the purpose of the invention as embodied and broadly described herein, a method of conserving energy in a node in a wireless network includes receiving a first powering-on schedule from another node in the network, and selectively powering-on at least one of a transmitter and receiver based on the received first schedule.

In another implementation consistent with the present invention, a method on conveying message in a sensor network includes organizing a senor network into a hierarchy of tiers, transmitting one or more transmit/receive scheduling messages throughout the network, and transmitting and receiving data messages throughout the network, and transmitting and receiving data messages between nodes in adjacent tiers based on the one or more transmit/received scheduling messages.

In a further implementation consistent with the present invention, a method of conserving energy in a multi-node network includes organizing the multi-node network into tiers, producing a transmit/received schedule at a first tier in the network, and controlling the powering-on and powering-off of transmitters and receivers in nodes in a tier adjacent to the first tier accordingly to transmit/received schedule.

In yet another implantation consistent with the present invention, a method of forwarding messages at a first node in a network includes receiving scheduling messages from a plurality of nodes in the network, selecting one of the plurality of nodes as parent node, and selectively forwarding data messages to the parent node based on the received scheduling messages associated with the selected one of the plurality of nodes.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 13 illustrates exemplary components of a monitor point consistent with the present invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Generally, ad hoc wireless networks according to the invention include nodes that continually generate and broadcast next, or pending, portions of their respective receiver schedules. In exemplary embodiments, network nodes transmit these pending schedules along with data traffic to other nodes in the network, and each node maintains a local receiver schedule database, including its own pending receiver schedule, as well as any pending receiver schedules received from other network nodes. To speed the dissemination of receiver schedule information throughout the network, nodes can transmit not only their own pending receiver schedules, but also those pending receiver schedules received from other network nodes.

Since the pending receiver schedules for the various nodes are independently generated, continually updated, and rapidly disseminated, each node is free to set its receiver schedule without consideration for any predefined time slot plan. Consequently, embodiments of the invention provide flexible and efficient communications, as each network node can dynamically adjust the amount of time its receiver is on and available. For example, a node can adjust its receiver duty cycle based on the type of activity the node is performing, the prevailing data traffic rate, the number of other nodes within communication range, etc. Additionally, each node can adjust the duration of individual reception intervals to accommodate transmissions of varying length (e.g., shorter control packets or longer data packets). Advantageously, such flexibility in reception interval duration also makes it more difficult for adversaries to monitor and jam communications. This is particularly true when, as is described hereinafter, pseudo-random techniques are used to establish start times and channels for the reception intervals.

Exemplary System

Figure 1:
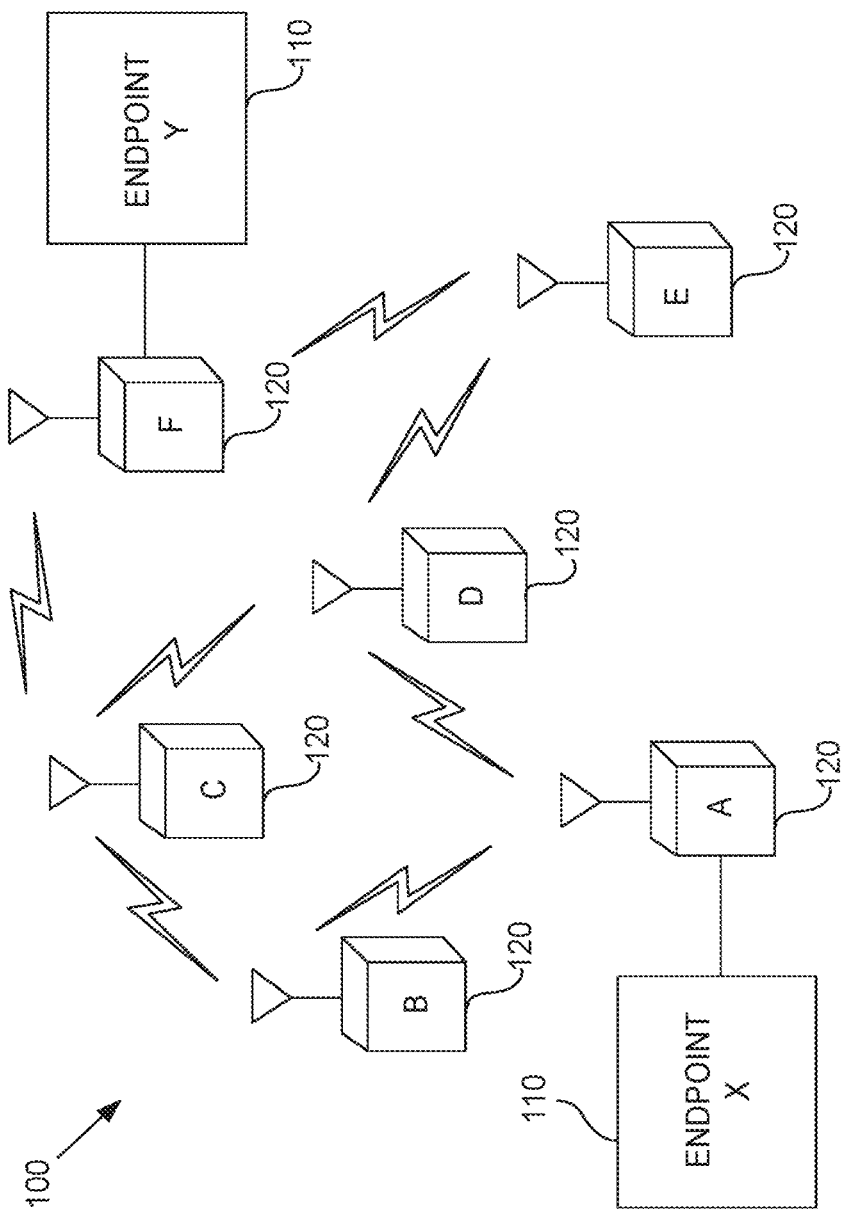
FIG. 1 depicts an exemplary ad hoc wireless network in which systems and methods consistent with the present invention may be implemented.

FIG. 1 is a diagram of an exemplary network 100 in which systems and methods consistent with the present invention can be implemented. As shown, network 100 can include a number of endpoint devices 110, as well as a number of intermediary nodes 120. Endpoint devices 110 can, for example, include various known devices, such as mainframe computers, minicomputers, workstations, personal computers, laptops, personal digital assistants, mobile telephones, handheld radios, or the like, capable of exchanging information with other devices. Additionally, intermediary nodes 120 can, for example, include various known devices, such as ground, airborne, underwater, and/or satellite based transceivers (employing radio, infrared, microwaves, acoustics, etc.), or the like, capable of passing or forwarding information from one device to another. Although, for sake of simplicity, two endpoint devices 110 and six intermediary nodes 120 are shown in FIG. 1, it will be understood that exemplary network 100 can in fact include any number of endpoint devices 110 and any number of intermediary nodes 120. It will also be appreciated that, although all endpoint devices 110 and intermediary nodes 120 appear stationary in FIG. 1, some or all endpoint devices 110 and intermediary nodes 120 can be, and often are, mobile in practice.

In operation, endpoint devices 110 (also referred to hereinafter as source and/or destination devices) communicate with one another by transmitting information messages via intermediary nodes 120 (also referred to hereinafter as relays or routers). For example, as is shown in FIG. 1, a first endpoint device 110, labeled X, can exchange information messages with a second endpoint device 110, labeled Y, via a communication path including any or all of six intermediary nodes 120, labeled A through F. As is well known in the art, the information messages can be conveyed, for example, by way of data and control packets, and the precise path (i.e., the particular chain of intermediary nodes 120) used to convey any given packet, or collection of packets, can be determined via routing algorithms operating within intermediary nodes 120. As is also well known in the art, such algorithms can, for example, adapt to accommodate node movements, node failures, changes in the physical communication paths between intermediary nodes 120, etc.

A network such as that depicted in FIG. 1 is often referred to in the art and hereinafter as an ad hoc wireless network. The descriptor "wireless" is used to indicate the fact that communication between intermediary nodes 120 is typically, though not always, via wireless links. Additionally, the descriptor "ad hoc" is used to indicate the highly flexible and portable nature of the network. In other words, because the nodes in such a network are typically mobile and thus able, indeed often expected, to intermittently join and leave the network, the network can be quickly established in a particular place, at a particular time, and for a particular purpose, and then just as quickly disband when necessary or desired.

It will be appreciated, however, that these aspects of exemplary network 100 of FIG. 1 are not requisite for operation of the receiver scheduling techniques of the present invention. For example, for purposes of the present invention, any or all of the various endpoint devices 110 and intermediary nodes 120 of network 100 can be stationary or mobile. Additionally, the link between any two intermediary nodes 120, as well as that between any endpoint device 110 and any intermediary node 120, can be wired, wireless, optical, etc. Moreover, while the endpoint devices 110 and intermediary nodes 120 are shown as separate devices in FIG. 1, it will be appreciated that in certain implementations, an endpoint device 110 can also perform the functions of an intermediary node 120, and vice versa. Accordingly, and as will be appreciated by those of ordinary skill, the invention is not limited to any specific hardware configuration.

Figure 2:
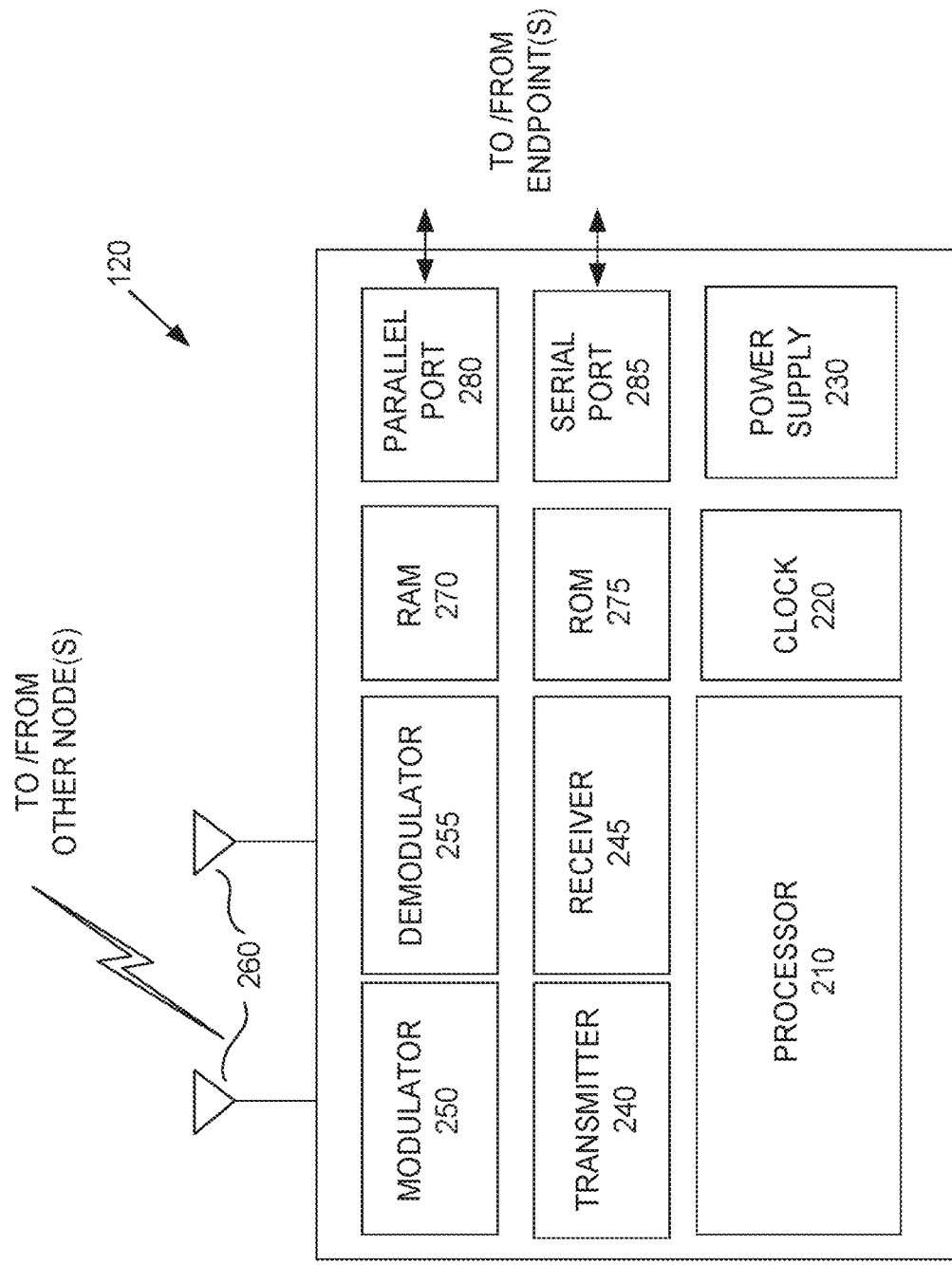
FIG. 2 depicts an exemplary node, according to embodiments of the present invention, for use in the wireless network of FIG. 1.

FIG. 2 is an exemplary diagram of an intermediary node 120 according to one implementation consistent with the present invention. As shown, node 120 can include a processor 210, a clock 220, a power supply 230, a transmitter 240, a receiver 245, a radio frequency (RF) modulator 250, a RF demodulator 255, RF antennae 260, a random access memory (RAM) 270, a read only memory (ROM) 275, a parallel communications port 280, and a serial communications port 285. As is well known, these components can be connected via one or more communication buses (not shown) and configured in any number of known ways to accomplish transmission, reception, and processing of information packets.

For example, processor 210 can include any type of conventional processor or microprocessor that interprets and executes instructions, and clock 220 can include any type of conventional timing circuitry for tracking a current time used in transmitting and receiving packets. Alternatively, processor 210 can include one or more application specific integrated circuits, as well as combinational logic, or the like, and clock 220 can include one or more counters and/or a global positioning system (GPS) receiver to provide a local time base that is synchronized with time bases used by other network components.

Power supply 230 can include conventional transformer/rectifier/filter circuitry, or the like, for providing power to the various components of node 120. Additionally, or in the alternative, power supply 230 can include a portable generator, a battery, fuel cell, or the like, for providing power in mobile contexts. Where power supply 230 includes a battery, the battery can be rechargeable, and any known recharging mechanism can be used (e.g., solar power).

Transmitter 240 and receiver 245 can utilize conventional wireless techniques to communicate packets to and from other devices (e.g., to and from other nodes 120) via, respectively, RF modulator 250 and RF demodulator 255 (RF modulator 250 and RF demodulator 255 being coupled to RF antennae 260). For example, transmission and reception can be accomplished using any known time, frequency, or code division multiple access scheme (e.g., any known TDMA, FDMA, CDMA, ultrawideband (UWB) communication technique or any combination thereof). While transmitter 240 and receiver 245 are shown as separate components in FIG. 2, it will be appreciated that they can instead take the form of a single transceiver. It will also be appreciated that RF antennae 260 can include any directional, multi-directional, or omni-directional antenna or antenna array.

RAM 270 can include a conventional RAM device or any other known dynamic storage device that stores information and/or instructions for use by processor 210. Additionally, ROM 275 can include a conventional ROM device or any other known static storage device that stores information and/or instructions for use by processor 210. Instructions used by processor 210 can also, or alternatively, be stored in any other known computer-readable medium, including one or more memory devices.

Communications ports 280, 285 can, for example, utilize known forms of wired communication to enable exchange of information packets between node 120 and other devices (e.g., an endpoint device 110). For example, parallel port 280 can provide a standard Ethernet connection, and serial port 285 can provide a standard RS-232 or USB connection. Alternatively, communications ports 280, 285 can be combined in a single device and can include any known mechanism enabling the node 120 to communicate with other devices via any known type of wired, wireless, or optical link.

From the foregoing description, it will be apparent that, although they are not all shown in FIG. 2, a variety of known component configurations are consistent with the present invention. For example, as is well known in the art, node 120 can include dual partitions (e.g., dual processors, dual transceivers, etc.) separated by one or more cryptographic units to provide added security (e.g., in certain military applications). Additionally, hardwired circuitry can be used in place of, or in combination with, software instructions to implement processes consistent with the present invention. Accordingly, and as will be appreciated by those of ordinary skill, the present invention is not limited to any specific hardware and/or software configuration.

During node operation, processor 210 works in conjunction with certain of the other node components (e.g., clock 220, transmitter 240, receiver 245, and communications ports 280, 285) to effect the above described packet transmission, reception, and routing, as well as the hereinafter described receiver scheduling techniques of the present invention. To do so, processor 210 can, for example, execute a series of software instructions retrieved from RAM 270, or from another suitable computer-readable medium. The software instructions can be loaded into RAM 270 (or into another suitable computer-readable medium) from any other suitable computer-readable medium, such as ROM 275, or from an external device via communication ports 280, 285 or receiver 245.

Figure 3:
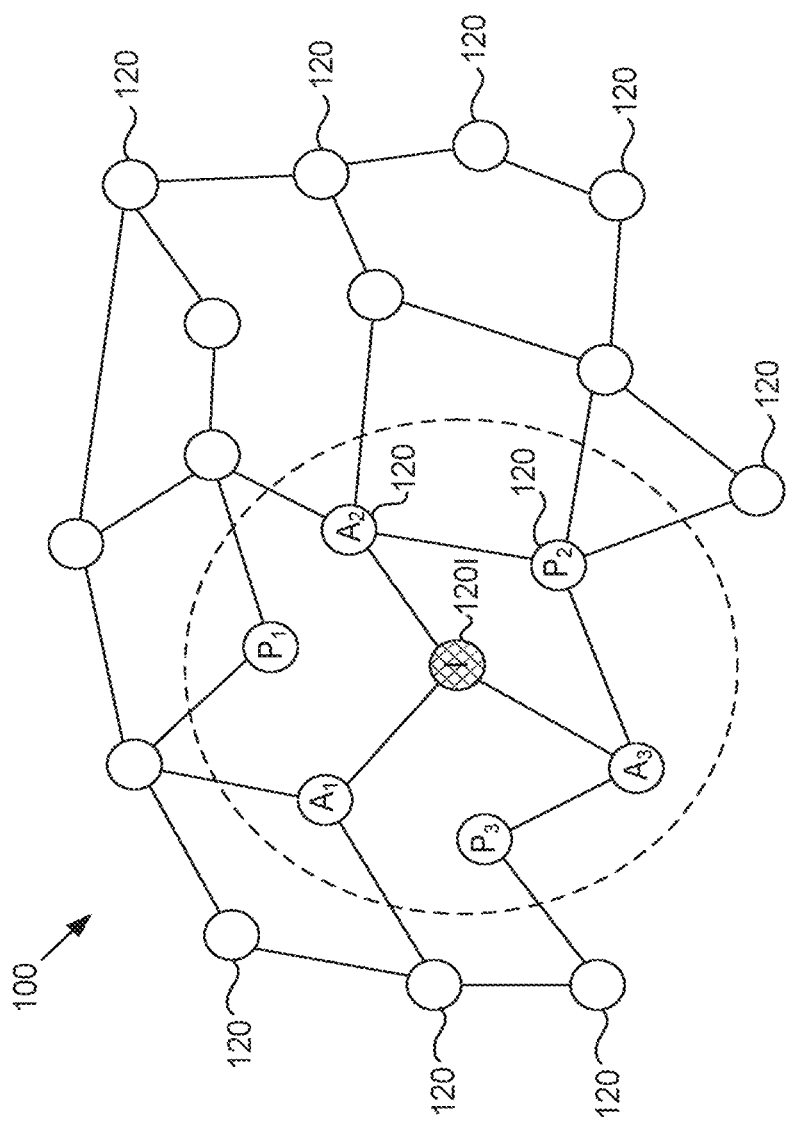
FIG. 3 depicts an effective coverage area of a node of the wireless network of FIG. 1, as well as a number of actual and potential neighboring nodes within the effective coverage area.

In order to conserve power, and/or to provide added network security, processor 210 can periodically power off receiver 245 during network operation. This practice, in combination with the fact that intermediary nodes 120 are generally free to join and leave network 100, makes it desirable, if not necessary, that active nodes 120 (i.e., those intermediary nodes 120 actually present and operating in the network at a given time) be informed as to when neighboring nodes 120 are present and available for communication. FIG. 3 illustrates this aspect of ad hoc wireless network 100 of FIG. 1.

In FIG. 3, exemplary network 100 is shown to include a large number of intermediary nodes 120, and solid lines connecting certain pairs of nodes 120 are used to indicate that the two nodes in each connected pair are aware of, and are able to communicate with, one another. A communication range of a particular intermediary node 120, labeled I in FIG. 3, is depicted as a dashed circle surrounding the particular node I. The range can, for example, represent the effective coverage area, antenna orientation, beam patterns, etc. of a radio transmitter-receiver combination such as that shown in FIG. 2. It will be appreciated, however, that the communication range will not typically be circular in practice. The precise shape of the coverage area will depend, for example, on terrain, reflections from surrounding objects, wireless interference, etc.

In FIG. 3, six neighboring nodes 120 are positioned within the communication range of the particular node I. Of these six neighboring nodes 120, only three nodes, labeled $A_1$-$A_3$, are shown to be mutually aware of, and thus able to communicate with, the particular node I (i.e., these three nodes are "actual" neighbors of the particular node I). While the remaining three neighboring nodes, labeled $P_1$-$P_3$, do fall within the communication range of the particular node I, they are not mutually aware of, and are thus unable to communicate with, the particular node I (i.e., they are merely "potential" neighbors of the particular node I). The three neighboring nodes labeled $P_1$-$P_3$ can, for example, represent nodes that have just entered and/or powered up within the communication range of the particular node I.

FIG. 3 thus demonstrates the importance of continually informing network nodes as to which neighboring nodes are available for communication. In other words, it is desirable that the particular node I be made aware of the three newly available nodes $P_1$-$P_3$, and vice versa, so that the nodes can potentially route information messages more directly and efficiently through network 100. Additionally, the particular node labeled I should be informed whenever known neighbors (e.g., the three nodes labeled $A_1$-$A_3$) power down, leave the area, or otherwise become unavailable for communication. Moreover, given that even the known and active neighbors of the particular node I can intermittently turn their receivers off as noted above, it is desirable that the particular node I be kept informed of the precise times the neighboring nodes will be available and operating to receive information messages. The present invention provides these and other advantages via novel receiver scheduling techniques described hereinafter.

Exemplary Processing

Generally, receiver scheduling, according to implementations consistent with the principles of the present invention, is achieved by configuring network nodes 120 to continually generate and broadcast next, or pending, portions of their respective receiver schedules whenever nodes 120 are active and participating in the network. Each node 120 transmits pending schedule portions along with data traffic to other nodes 120, and maintains a database including its own and other pending receiver schedules. In this way, nodes 120 are kept continually abreast, not only of the arrival and departure of neighboring nodes 120, but also of the pending receiver schedules for active neighboring nodes 120. Moreover, because pending receiver schedules for different nodes 120 may be generated independently of one another and then quickly disseminated within the network, each node 120 is able to tailor its own receiver schedule in view of changing network conditions, and without regard to the restrictive time slot limitations imposed by conventional receiver scheduling techniques.

Figure 4:
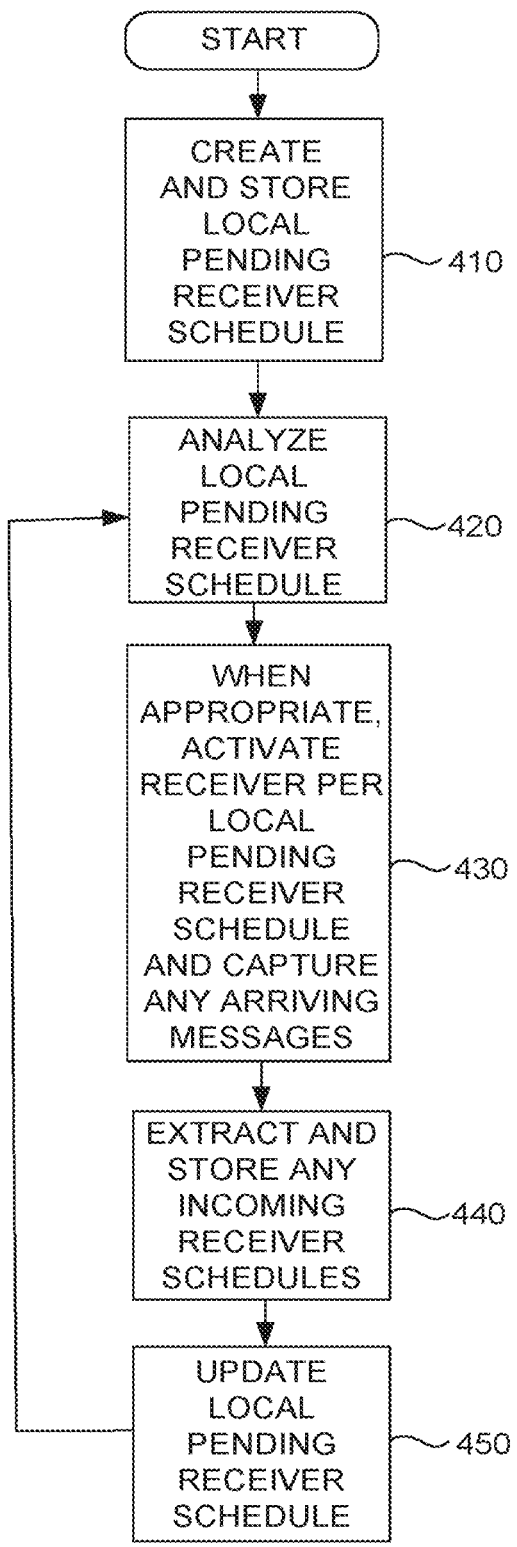
FIG. 4 is a flowchart depicting an exemplary method for developing and maintaining a local receiver schedule according to embodiments of the present invention.
Figure 5:
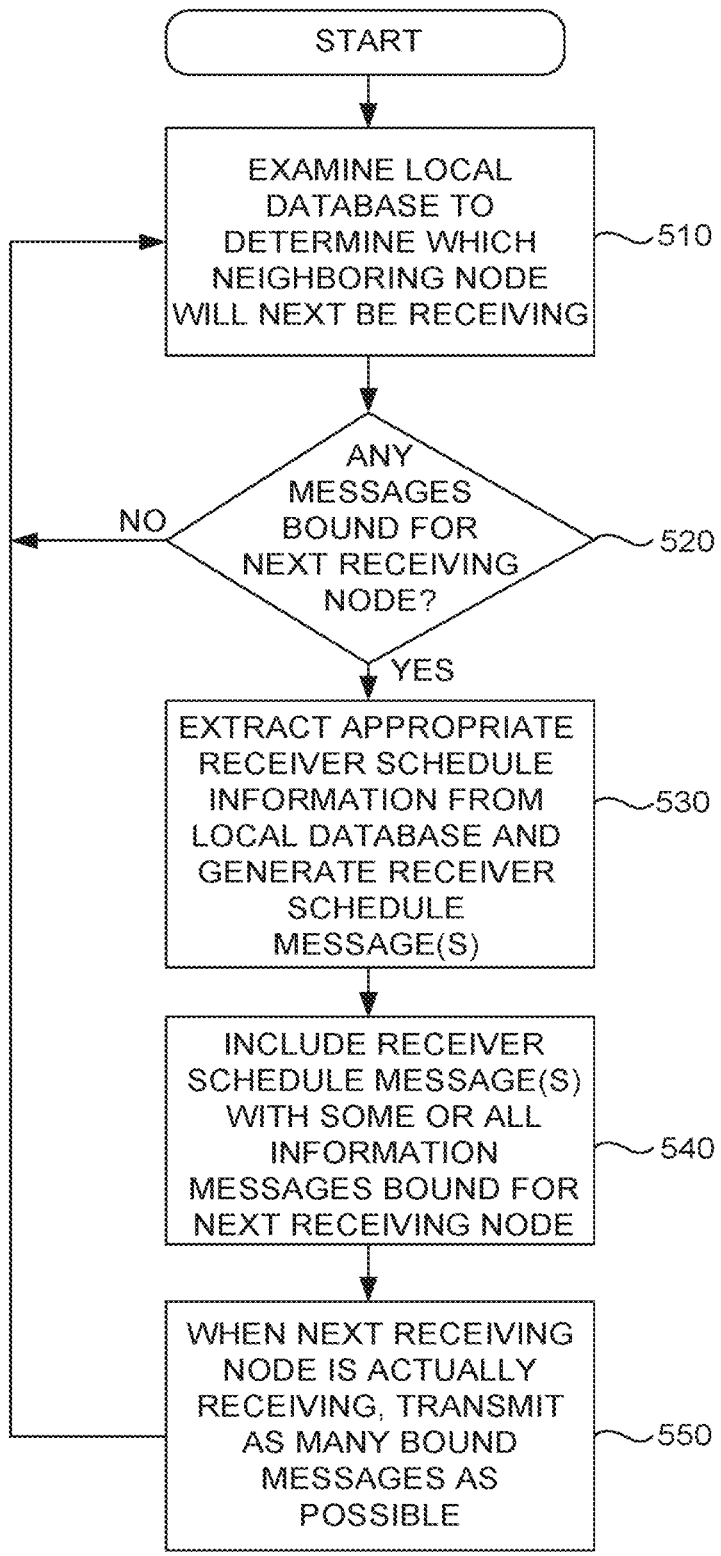
FIG. 5 is a flowchart depicting an exemplary method for disseminating local receiver schedules according to embodiments of the present invention.

FIG. 4 depicts an exemplary method, according to implementations consistent with the invention, of developing and maintaining a pending receiver schedule and a pending receiver schedule database within a node 120 of an ad hoc wireless network. Additionally, FIG. 5 depicts an exemplary method, according to implementations consistent with the invention, of disseminating receiver schedule information from such a node 120. In combination, the exemplary methods of FIGS. 4 and 5 provide a complete receiver scheduling scheme in accordance with the principles of the invention. It will be appreciated that the techniques described with respect to FIGS. 4 and 5 can be implemented using known hardware and software configurations. For example, processor 210 of FIG. 2 can carry out software instructions to perform the various acts described in FIGS. 4 and 5. Additionally, RAM 270 of FIG. 2 can be used within a network node 120 to store the receiver scheduling information generated and disseminated in the processing of FIGS. 4 and 5. As noted above, however, the present invention is not limited to any specific hardware and/or software configuration.

The processing described in FIG. 4 can, for example, be executed by a network node 120 upon joining an ad hoc wireless network such as that of FIG. 1. As shown, processing can begin with node 120 creating and storing a local pending receiver schedule (act 410). According to one implementation of the present invention, the local pending receiver schedule can include a finite number of reception definitions, where each reception definition includes a number of parameters that together indicate a specific time and manner in which node 120 will operate (e.g., power up and tune its receiver 245) to receive messages transmitted by other nodes.

In practice, the precise number and type of parameters included in each reception definition will depend upon the media and format used to transmit information messages between network nodes 120. For example, in instances where packets are transmitted using a conventional frequency-hopping format, each reception definition can include a reception starting time, a reception duration, and an appropriate carrier frequency (i.e., information indicating, by way of practical example, that reception begins in 3.85 seconds at 42.356 MHz and lasts 10 milliseconds). Since, for purposes of the present invention, any suitable medium (including radio, infrared, microwave, etc.) and any suitable format (including, TDMA, FDMA, CDMA, pulse width modulation, pulse code modulation, etc.) can be used to transmit messages between network nodes 120, it will be appreciated that a reception definition consistent with the invention can include any suitable combination of parameters that sufficiently describe a unique reception instance for a particular media and a particular format.

Additionally, the number of reception definitions included in the local pending receiver schedule can be set (and thereafter dynamically adjusted) depending, for example, upon the number of nodes 120 participating or expected to participate in the network, the prevailing or expected volume of network traffic, etc. In other words, given that the local pending receiver schedule is disseminated to other network nodes (as is described below with respect to FIG. 5), and given that there is some, albeit small, overhead associated with that dissemination, the size of the pending receiver schedule is chosen to maximize network efficiency for a given context.

According to implementations of the invention, the parameter values (i.e., the times, channels, etc.) included in each reception definition can also be set in a number of ways. For example, the parameters can be preset in node 120 or dynamically determined at node 120 during network operation based, for example, upon prevailing or predicted traffic flow at node 120, the number of neighboring nodes, the power remaining in the node battery, some or all known schedules for other nodes in the network, etc. Alternatively, where transmission security is an issue, the parameters can be set based on output of a pseudo-random number generator (PRNG), or based on some measurable physical random process (e.g., thermal noise, radioactive decay, or the like).

Once created, the local pending receiver schedule can be stored as part of a local pending receiver schedule database (e.g., in RAM 270 of FIG. 2). Thereafter, node 120 can analyze the local pending receiver schedule to determine when and how the node's receiver 245 should next be turned on and tuned to receive information messages from other network nodes 120 (act 420). For example, the first reception definition in the pending receiver schedule can be retrieved from the pending receiver schedule database, and the parameters of the retrieved reception definition can be used to control the next reception operation of node 120. Thus, at the appropriate time and in the appropriate manner (for example, as defined by the parameters of the retrieved reception definition), node 120 can power up its receiver 245, tune to the appropriate frequency, and capture any information messages being transmitted to it (act 430).

In implementations consistent with the present invention, and as is described in detail below with respect to FIG. 5, the messages received by node 120 can include pending receiver schedules for other network nodes 120. Accordingly, node 120 can extract any incoming receiver schedules and store them in the local pending receiver schedule database (e.g., for use in transmitting messages to the other nodes, as is described below with respect to FIG. 5) (act 440). Thereafter, node 120 can update its own pending receiver schedule (act 450). For example, node 120 can delete the reception definition used in act 430 from the pending receiver schedule, and append a new reception definition to the pending receiver schedule. The new reception definition can, for example, be generated using the same techniques used to generate reception definitions for the initial local receiver schedule (e.g., based on a PRNG output stream).

Additionally, it will be understood that a node may take the known schedules of other nodes into account when preparing its own next, or pending, schedule. For instance, when node 120 updates its own pending receiver schedule (act 450), node 120 may ensure that its new reception definition does not overlap or conflict with any definitions in the known schedules for other nodes in the network as recorded in the local receiver schedule database.

Once the local receiver schedule has been updated, processing can return to act 420, and the above described cycle (i.e., acts 420 to 450) can be repeated as long as node 120 is active and participating in network 100. Thus, according to the exemplary process of FIG. 4, node 120 generates and then continually updates its own pending receiver schedule, while at the same time using the prevailing receiver schedule (i.e., the current, or most recently updated, pending receiver schedule) to control reception of information messages (and any included pending receiver schedules) from other network nodes 120. The prevailing local receiver schedule can be disseminated to other nodes 120 in network 100 as is next described with respect to FIG. 5.

FIG. 5 depicts an exemplary receiver schedule dissemination process that can be executed in parallel with the exemplary process described above with respect to FIG. 4. To maintain synchronization between the processes of FIGS. 4 and 5, node 120 can, for example, execute the process of FIG. 5 once during each node reception interval (e.g., once each time node 120 executes act 430 of FIG. 4). As shown, processing can begin with node 120 examining the local pending receiver schedule database (which is developed as described above with respect to FIG. 4, and which includes pending reception definitions for neighboring nodes, as well as pending reception definitions for the node itself) to determine which neighboring node 120 will next be receiving (act 510). Node 120 can, for example, identify a next receiving node by locating a minimum, or earliest, start time across all database entries associated with neighboring nodes 120.

Once the next receiving neighbor has been established, node 120 can determine whether any information messages (e.g., any control and/or data packets) are bound for the next receiving node 120 (act 520). Node 120 can make such determination using conventional techniques (i.e., data traffic is received and queued at the node using well known traffic routing methods). If no information messages are bound for the next receiving node 120, then processing can return to act 510, where node 120 can again determine the next receiving node 120. However, if information messages are bound for the next receiving node 120, then node 120 can prepare receiver scheduling information for inclusion with some or all of the outgoing information messages (act 530).

More specifically, node 120 can create a receiver scheduling message, or RSM, using information retrieved from the local receiver schedule database. At a minimum, the RSM can include the prevailing local pending receiver schedule (developed as described above with respect to FIG. 4, and including a list of reception definitions for node 120 itself). Additionally, the RSM can include some or all of the pending receiver schedules, if any, that have been previously collected from neighboring nodes (i.e., during earlier occurrences of act 430 of FIG. 4). For examples when relatively few pending receiver schedules have been collected (which will typically be the case in smaller networks), the RSM can include the local receiver schedule database in its entirety. However, in larger networks, inclusion of the entire receiver schedule database may not be feasible. In such a case, node 120 can include a particular subset of the collected pending receiver schedules in the RSM (e.g., using random selection, round-robin selection, etc., or some form of biased selection based, for example, on a preset ranking of node importance, or on a dynamically adjusted node ranking based on observed traffic flow, path characteristics, etc.).

Once the RSM is created, node 120 can include the RSM (e.g., as part of a header) with some or all of the information messages bound for the next receiving node (act 540). Thereafter, node 120 can transmit the RSM-laden messages to the next receiving node (at an appropriate time and in an appropriate manner, as dictated by the reception definition used to identify the next receiving node at act 510). Once the messages have been transmitted, processing can return to act 510 (perhaps after waiting for the start of the next node reception at act 430 of FIG. 4), and the transmission cycle (i.e., acts 510 through 550) can be repeated.

Thus, an intermediary node 120 continually transmits its own locally-generated pending receiver schedule and, possibly, pending receiver schedules received from other nodes 120. Moreover, when each one of a network of nodes 120 executes the processing described in FIGS. 4 and 5 in combination, the result is a proliferation of up-to-date pending receiver schedules throughout the network. Consequently, it is possible, especially in smaller networks, for a newly activated node 120 to learn the prevailing receiver schedule for an entire network just by receiving a single RSM-carrying information message. Even in larger networks, very few messages are required to inform a newly activated node 120 of most or all of the already active nodes 120 in the network (i.e., since different nodes will tend to forward different subsets of pending receiver schedules, and since the newly activated node will likely receive messages from more than one neighboring node).

It should be noted that conventional beaconing techniques can be used in conjunction with the processing described in FIGS. 4 and 5 to allow a newly arriving node (i.e., a node that has yet to receive even a single RSM, and therefore knows nothing of the network it is trying to join) to successfully receive or transmit a first message. According to such beaconing techniques, all network nodes 120 transmit beacons, including receiver scheduling information, at preset or pseudo-random times. A newly arriving node 120 can thus power up its receiver 245 and listen for beacons from nearby nodes 120. Once a beacon (and the included receiver schedule information) has been received, the newly arriving node 120 can proceed to function normally in the network.

Figure 6:
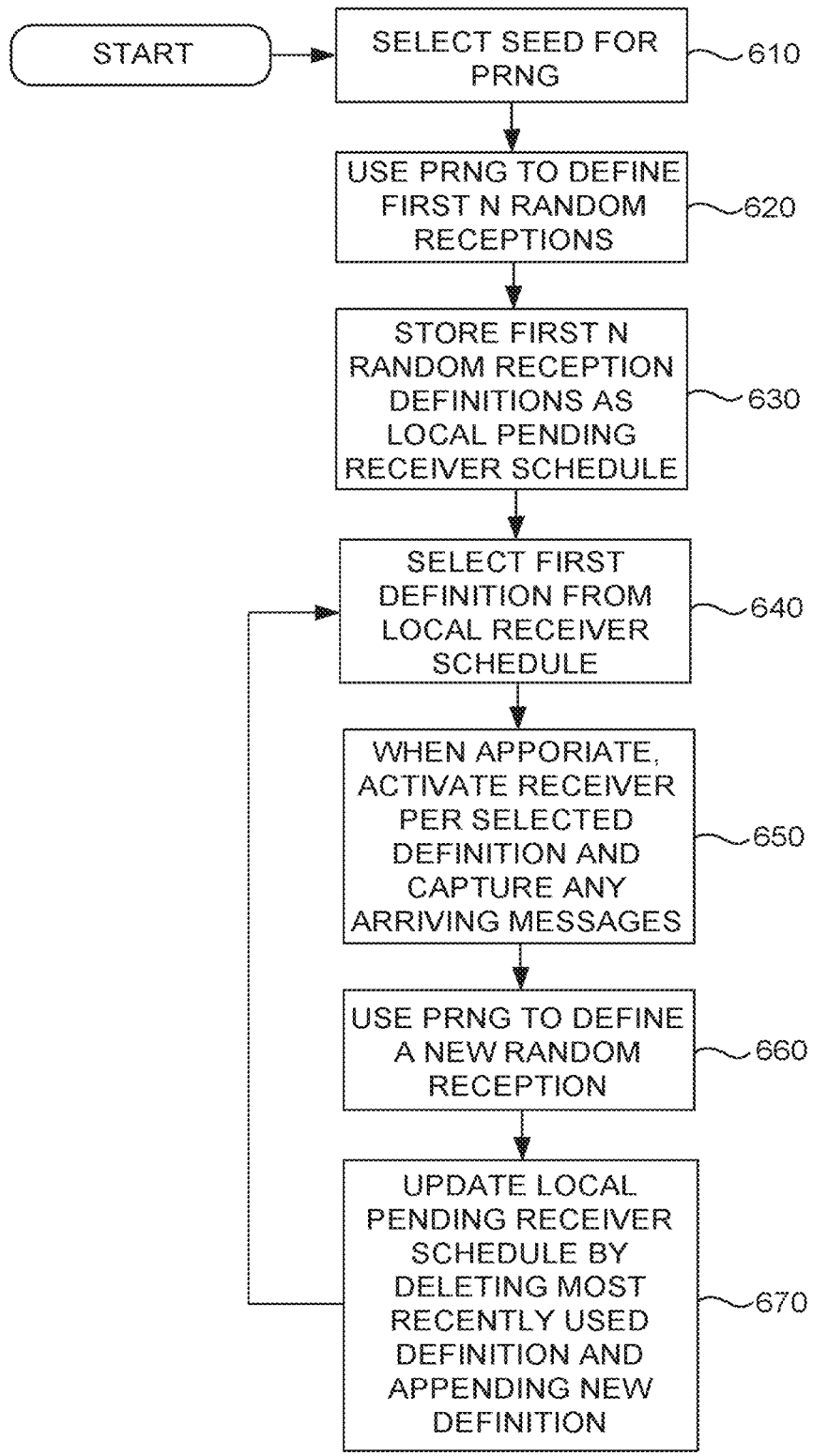
FIG. 6 is a flowchart depicting an exemplary implementation of the receiver schedule development and maintenance method of FIG. 4.

To further illuminate the various features and advantages of the receiver scheduling techniques of the present invention, FIG. 6 depicts a specific exemplary implementation of the schedule generation and maintenance processing described in FIG. 4. The exemplary implementation is intended for use in a network in which a standard frequency-hopping scheme is used to carry out communications between intermediary nodes (i.e., each transmission of an information message occurs on one of a number of preset carrier frequencies). Also, the processing of FIG. 6 presumes that it is desirable for successive transmissions to be randomized (e.g., for security purposes). Like the processing of FIG. 4, the processing of FIG. 6 can be executed within an intermediary node 120 (e.g., via processor 210 of FIG. 2), and in parallel with the dissemination processing described in FIG. 5.

In FIG. 6, processing can begin with node 120 selecting a PRNG seed using known techniques (act 610). Thereafter, node 120 can use the PRNG seed to generate a finite number N of reception definitions (act 620). More specifically, node 120 can generate a PRNG stream based on the selected PRNG seed (again using known techniques), and use the PRNG stream to establish a starting time and a carrier frequency for each of the N reception definitions. Additionally, node 120 can determine a duration for each of the N reception definitions (e.g., using the PRNG stream, or based upon observed network conditions as described above with respect to FIG. 4). As noted previously, the precise number N of reception definitions can be set, either a priori or at run time, based on expected or observed network conditions. Once the N reception definitions are established, node 120 can store them (e.g., in RAM 270 of FIG. 2) as a local pending receiver schedule for node 120 (act 630).

Thereafter, node 120 can select the first reception definition in the local pending receiver schedule to govern a next reception operation for node 120 (act 640). Thus, at an appropriate time (as indicated by the start time associated with the selected reception definition) and in an appropriate manner (as indicated by the duration and the carrier frequency associated with the selected reception definition), node 120 powers up and tunes its receiver to accept any information messages being transmitted to node 120 (act 650). As described above with respect to FIG. 4, the received information messages can include receiver schedule messages, which node 120 extracts and stores for use in transmitting messages to neighboring nodes. If the timing parameters included with the incoming receiver schedule messages are given in relative terms (e.g., a start time of x seconds indicating that the associated reception will begin x seconds after the reception definition was transmitted), then node 120 can map the incoming timing parameters to its own time base prior to storing them. Alternatively, if network nodes 120 share a common time base (e.g., via GPS receivers), then timing parameters can be given in absolute network time, and no mapping may be necessary.

Once reception of incoming messages is concluded, and once any incoming receiver schedule messages have been extracted and stored, node 120 can update the local pending receiver schedule (acts 660 and 670). More specifically, node 120 can use the PRNG stream to generate a new reception definition (i.e., a new random start time and a new random carrier frequency, as well as a new duration which can be set either randomly or strategically), and then modify the local pending receiver schedule by deleting the first reception definition (i.e., the definition just selected and used in acts 640 and 650, respectively) and appending the newly generated reception definition. Thereafter, processing can return to act 640, and the foregoing cycle (i.e., acts 640 through 670) can be repeated as long as node 120 is present and active in the network. Thus, node 120 effectively generates a rolling window of N pending reception definitions, each successive definition including a pseudo-randomly generated start time, duration, and carrier frequency.

At the same time, node 120 can disseminate this rolling window using the exemplary process described above with respect to FIG. 5. In other words, node 120 can include the prevailing N reception definitions in receiver schedule messages that are in turn included with information messages bound for other network nodes. As described in detail above, the outgoing receiver schedule messages can also include pending receiver schedules previously collected from other network nodes. Thus, a receiver schedule message for the exemplary embodiment depicted in FIG. 6 can appear as shown in FIG. 7.

Figure 7:
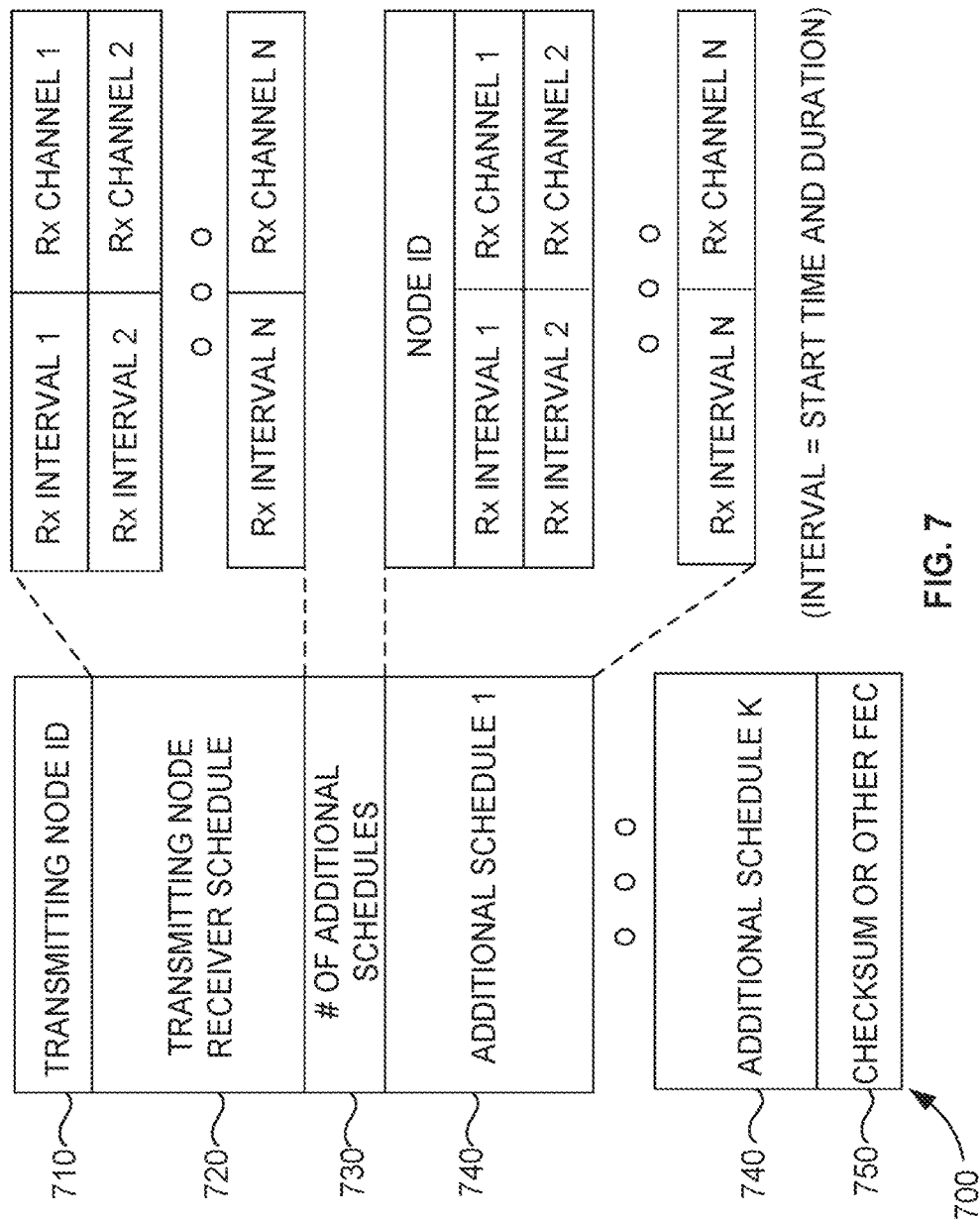
FIG. 7 depicts an exemplary receiver schedule message that can be used in conjunction with the implementation of FIG. 6.

In FIG. 7, exemplary receiver schedule message 700 can include a transmitting node identification field 710, as well as a transmitting node receiver schedule field 720. As shown, transmitting node receiver schedule 720 includes N reception definitions, each reception definition including a reception interval (i.e., a start time and a duration) and a reception channel (i.e., a carrier frequency). Additionally, the exemplary receiver schedule message 700 can optionally include an additional schedule count field 730, additional pending receiver schedule fields 740, and an error correction field 750.

Additional schedule count field 730 can indicate a number, if any, of additional pending receiver schedule fields 740 to follow. As shown, each additional pending receiver schedule 740 can include a node identification field and an associated collection of N reception definitions (each definition in turn including an associated interval and channel). Error correction field 750 can include information to ensure accurate transmission of the receiver schedule message 700. Note also that the receiver schedule message 700 can be encrypted using known techniques to provide added security (e.g., network nodes can use a shared encryption key to code and decode messages as they are transmitted and received).

Advantageously, receiver schedule message 700 can be used in the exemplary processes of FIGS. 5 and 6 to provide the above described benefits of performing receiver scheduling in accordance with the principles of the invention. For example, the pseudo-random nature of the reception start times and channels provides significant protection against network adversaries. Moreover, the reception durations can be set, for example, to accommodate varying network conditions and/or varying incoming packet lengths.

Figure 8:
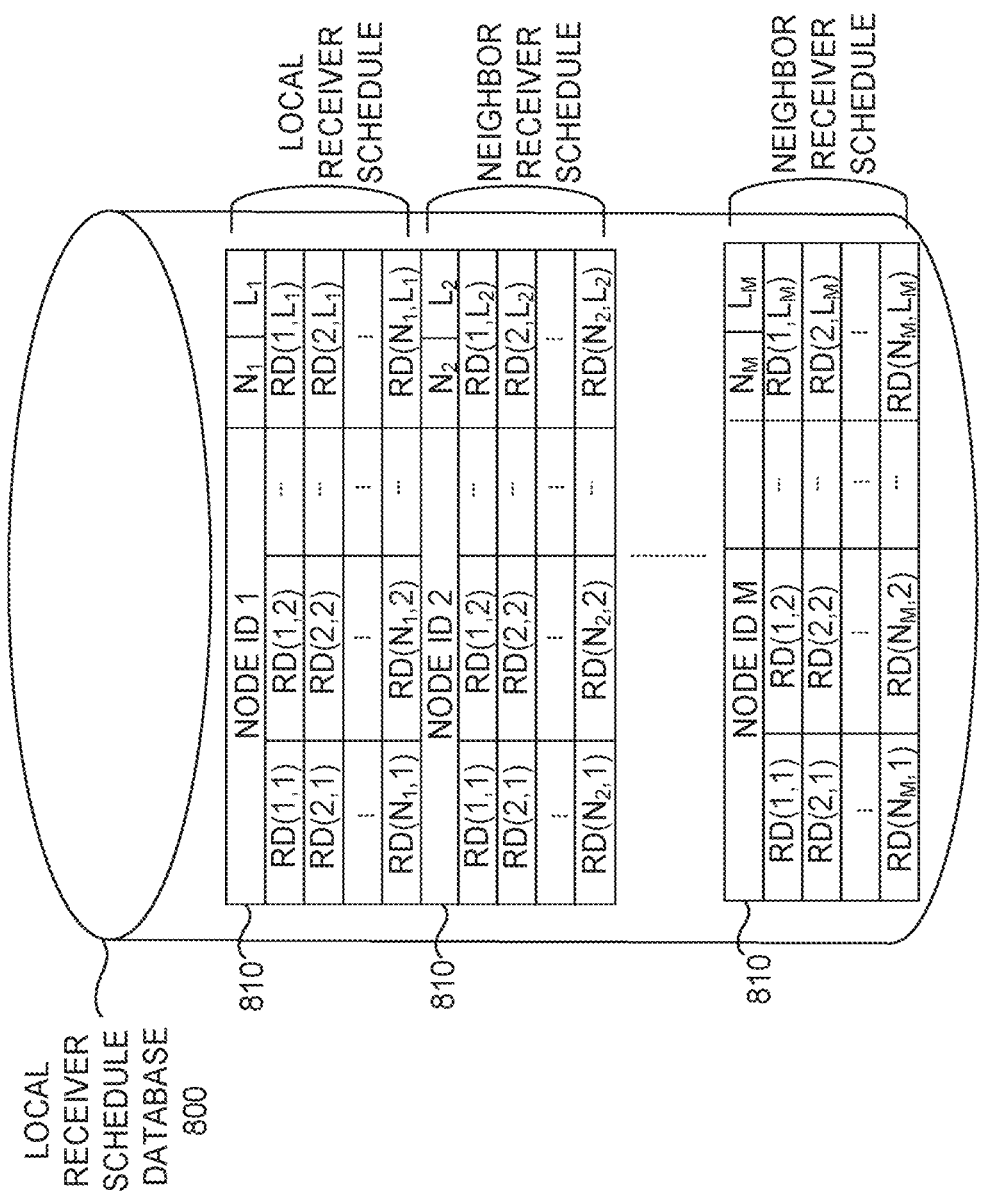
FIG. 8 depicts an exemplary local receiver schedule database that can be used to store receiver schedule information according to embodiments of the present invention.

As described above, node 120 of FIG. 2 can construct a receiver schedule message, such as receiver schedule message 700 of FIG. 7, from receiver schedule data stored within a local receiver schedule database (the local receiver schedule database in turn residing, for example, within RAM 270 of FIG. 2). FIG. 8 depicts an exemplary local receiver schedule database 800 consistent with implementations of the present invention. As shown, local receiver schedule database 800 includes a number M of pending receiver schedules 810. A first one of pending receiver schedules 810 can, for example, be a local pending receiver schedule for node 120 of FIG. 2, and all other pending receiver schedules 810 can, for example, be pending receiver schedules for other network nodes 120.

As shown, each pending receiver schedule 810 includes a node identification field (used to identify a particular node 120 to which schedule 810 applies), a reception definition count field (used to indicate a number N of reception definitions included in schedule 810), and a reception definition parameter count field (used to indicate a number L of parameters included in each reception definition in schedule 810). Additionally, each schedule 810 includes an N×L array of reception definition parameters (i.e., N rows of L parameters, each row corresponding to a single reception definition).

As described above, the medium and mode of communication between network nodes 120 will, in practice, dictate the number and type of parameters included in each reception definition. For example, in a standard radio frequency-hopping system, each reception definition can include just three parameters (i.e., a start time, a duration, and a carrier frequency). Note also that the number N of reception definitions per schedule, as well as the number L of parameters per reception definition, can be fixed and identical for all network nodes 120. If so, then pending receiver schedules 810 need not include the reception definition count field or the reception definition parameter count field shown in FIG. 8.

Systems and methods consistent with the present invention include networks nodes that continually generate and broadcast next, or pending, portion of their respective receiver schedule. Accordingly to exemplary embodiments, certain aspects of the pending schedule portions are generated and updated in a pseudo-random fashion, and the pending schedule portions are transmitted along with data traffic among the network nodes. Each network node maintains a local receiver schedule database, including its own pending receive schedule database, including its own pending receiver schedule, as well as any pending receiver schedules received from other network nodes. To speed dissemination of received schedule information throughout the network, nodes transmit not only their own pending receiver schedules, but also those pending receiver schedules from other network nodes. Since the pending receiver schedules for the various nodes independently generated, continually updated, and rapidly disseminated, each node is able to set its own receiver schedule without consideration for any predefined scheduling plan. Embodiments are this able to provide flexible, efficient and robust communication.

Systems and methods consistent with the present invention provide mechanisms for conserving energy in wireless node by transmitting scheduling messages throughout the node of the network. The scheduling messages include time schedules for selectively powering-on and powering-off node transmitters and receivers. Messages datagrams and routing messages may, thus, be conveyed throughout the network during appropriates transmitter/receiver power-on and power-off intervals.

Exemplary Network

Figure 9:
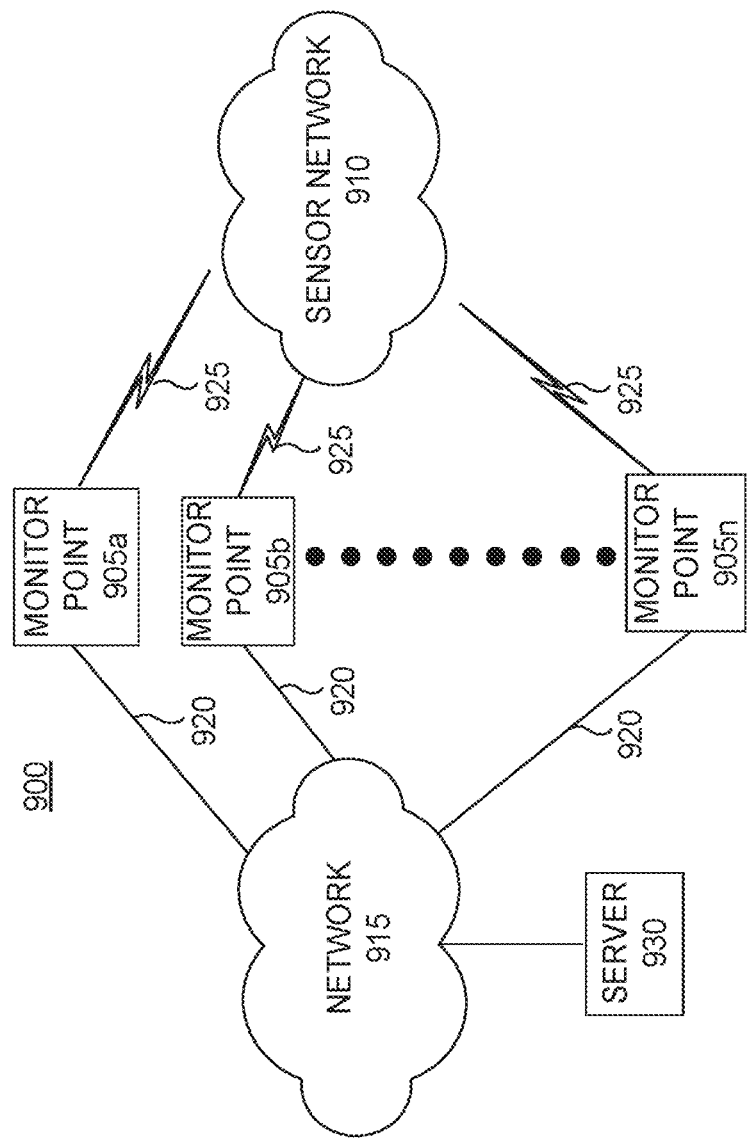
FIG. 9 illustrates an exemplary network consistent with the present invention.

FIG. 9 illustrates an exemplary network 900, consistent with the present invention. Network 900 may include monitor points 905a-905n connected to senor network 910 and network 915 via wired 920, wireless 925, or optical connection link (not shown). Network 900 may further include one or more servers 930 interconnected with network 915.

Monitor points 905a-905n may include data transceiver units for transmitting messages to, and receiving messages from, one or more sensors of sensor network 910. Such messages may include routing messages containing network routing data, messages datagrams containing sensor measurement data, and schedule messages containing sensor node transmit and receive scheduling data. The routing messages may include identification data for one of more monitor points, and the number of hop to reach each respective identified monitor point, as determined by a sensor node/monitor point that is the source of the routing messages. The routing messages may be transmitted as wireless broadcast messages in network 900. The routing messages, thus, permit sensor nodes to determine a minimum hop path to a monitor point in network 900. Through the use of routing messages, monitor points 905a-905n may operate as "sinks" for sensor measurements made at nearby sensor nodes. Messages datagrams may include sensor measurement data that may be transmitted to a monitor point 905a-905n for data collection.

Message datagrams may be sent from a monitor point to a sensor node, from a sensor node to a monitor point, or from a sensor node to a sensor node. Sensor network 910 may include one or more distributed sensor nodes (not shown) that may organize themselves into an ad-hoc, multi-hop wireless network. Each of the distributed sensor nodes of sensor network 910 may include one or more of any type of conventional sensing device, such as, for example, acoustic sensors, motion-detection sensors, radar sensors, sensors that detect specific chemicals or families of chemicals, sensors that detect nuclear radiation or biological agents, magnetic sensors, electronic emissions signal sensors, thermal sensors, and visual sensors that detect or record still or moving images in the visible or other spectrum. Sensor nodes of sensor network 910 may perform one or more measurements over a sampling period and transmit the measured values via packets, datagrams, cells or the like to monitor points 905a-905n.

Network 915 may include one or more networks of any type, including a Public Land Mobile Network (PLMN), Public Switched Telephone Network (PSTN), local area network (LAN), metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks.

Server 930 may include a conventional computer, such as a desktop, laptop or the like. Server 930 may collect data, via network 915, from each monitor point 905 of network 900 and archive the data for future retrieval.

Exemplary Sensor Network

Figure 10:
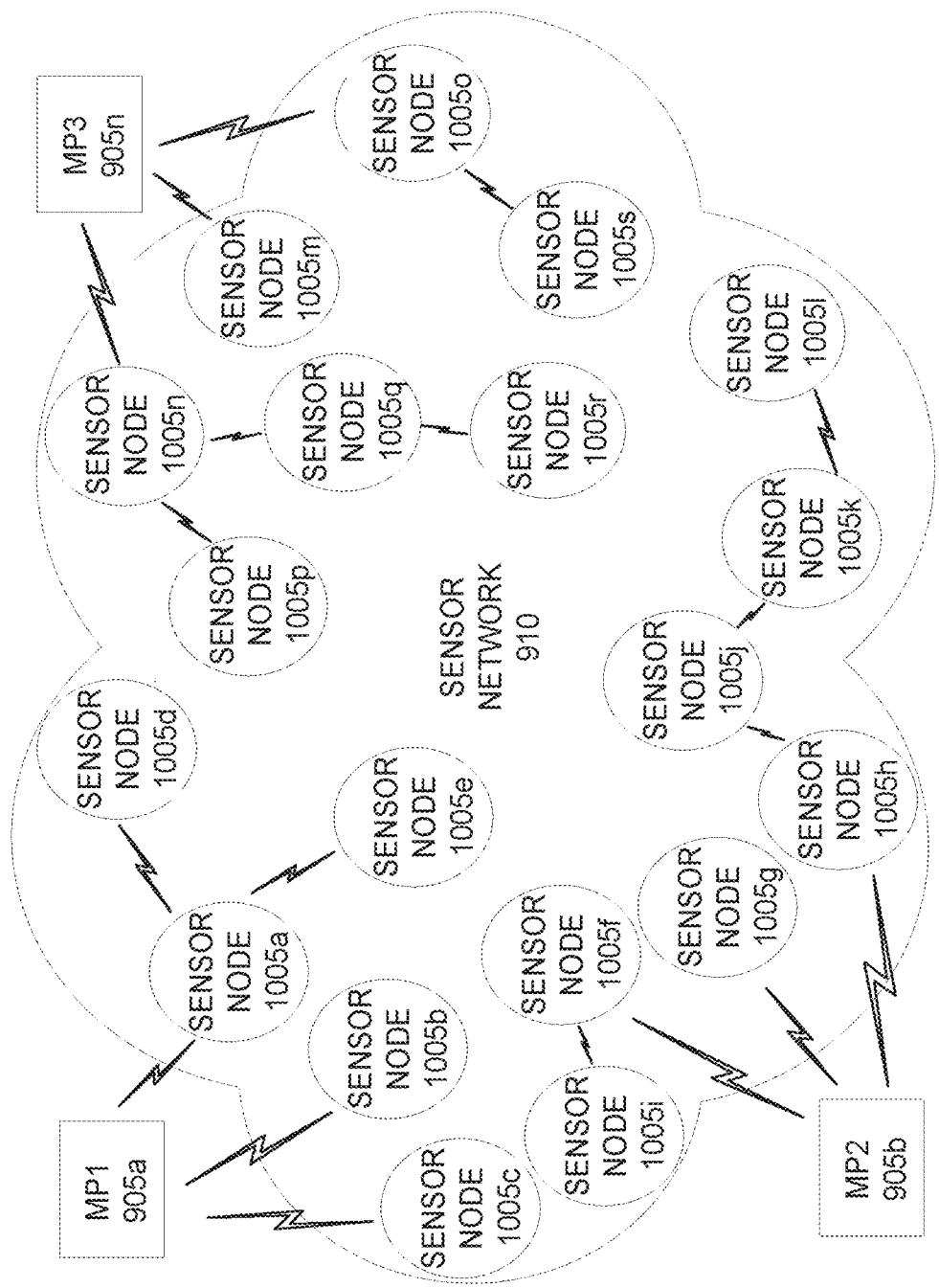
FIG. 10 illustrates an exemplary sensor network consistent with the present invention.

FIG. 10 illustrates an exemplary sensor network 910 consistent with the present invention. Sensor network 910 may include one or more sensor nodes 1005a-1005s that may be distributed across a geographic area. Sensor nodes 1005a-1005s may communicate with one another, and with one or more monitor points 905a-905n, via wireless or wire-line links (not shown), using, for example, packet-switching mechanisms. Using techniques such as those described in co-pending U.S. patent application Ser. No. 09/999,353, entitled "Systems and Methods for Scalable Routing in Ad-Hoc Wireless Sensor Networks" and filed Nov. 15, 2001 (the disclosure of which is incorporated by reference herein), sensor nodes 1005a-1005s may organize themselves into an ad-hoc, multi-hop wireless network through the communication of routing messages and message datagrams.

Figure 11:
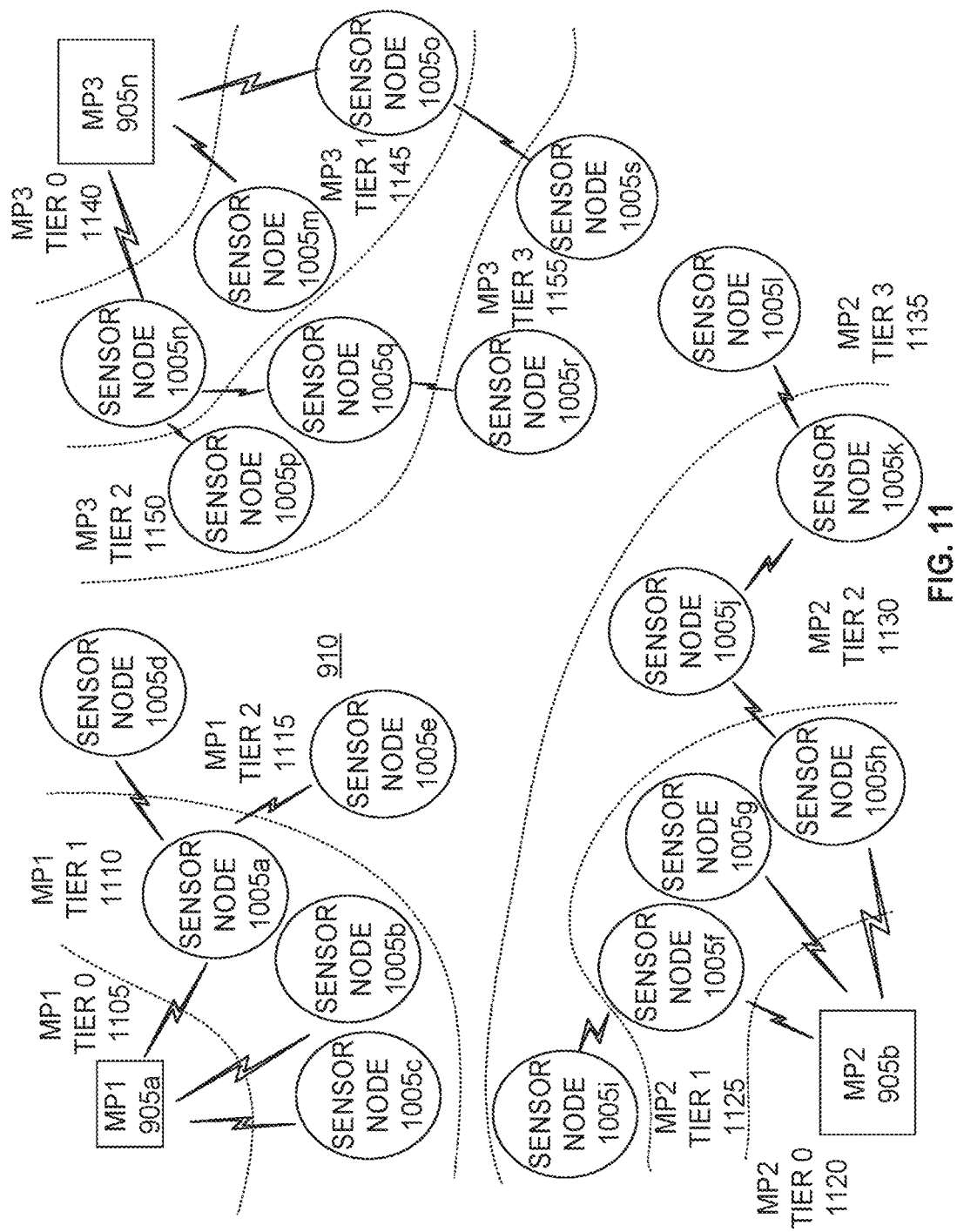
FIG. 11 illustrates the exemplary sensor network of FIG. 10 organized into tiers consistent with the present invention.

FIG. 11 illustrates sensor network 910 self-organized into tiers using conventional routing protocols, or the routing protocol described in the above-described co-pending U.S. patent application Ser. No. 09/999,353. When organized into tiers, messages may be forwarded, hop by hop through the network, from monitor points to sensor nodes, or from individual sensor nodes to monitor points that act as "sinks" for nearby sensor nodes. As shown in the exemplary network configuration illustrated in FIG. 11, monitor point MP1 905a may act as a "sink" for message datagrams from sensor nodes 1005a-1005e, monitor point MP2 905b may act as a "sink" for message datagrams from sensor nodes 1005f-

1005*l*, and monitor point MP3 905*n* may act as a "sink" for message datagrams from sensor nodes 1005*m*-1005*s*.

As further shown in FIG. 11, monitor point MP1 905*a* may reside in MP1 tier 0 1105, sensor nodes 1005*a*-1005*c* may reside in MP1 tier 1 1110, and sensor nodes 1005*d*-1005*e* may reside in MP1 tier 2 1115. Monitor point MP2 905*b* may reside in MP2 tier 0 1120, sensor nodes 1005*f*-1005*h* may reside in MP2 tier 1 1125, sensor nodes 1005*i*-1005*k* may reside in MP2 tier 2 1130 and sensor node 1005*l* may reside in MP2 tier 3 1135. Monitor point MP3 905*n* may reside in MP3 tier 0 1140, sensor nodes 1005*m*-1005*o* may reside in MP3 tier 1 1145, sensor nodes 1005*p*-1005*q* may reside in MP3 tier 2 1150 and sensor nodes 1005*r*-1005*s* may reside in MP3 tier 3 1155. Each tier shown in FIG. 11 represents an additional hop that data must traverse when traveling from a sensor node to a monitor point, or from a monitor point to a sensor node. At least one node in any tier may act as a "parent" for nodes in the next higher tier (e.g., MP1 Tier 2 1115). Thus, for example, sensor node 1005*a* acts as a "parent" node for sensor nodes 1005*d*-1005*e*. Sensor nodes 1005*d*-1005*e* may relay all messages through sensor node 1005*a* to reach monitor point MP1 905*a*.

Exemplary Sensor Node

Figure 12:
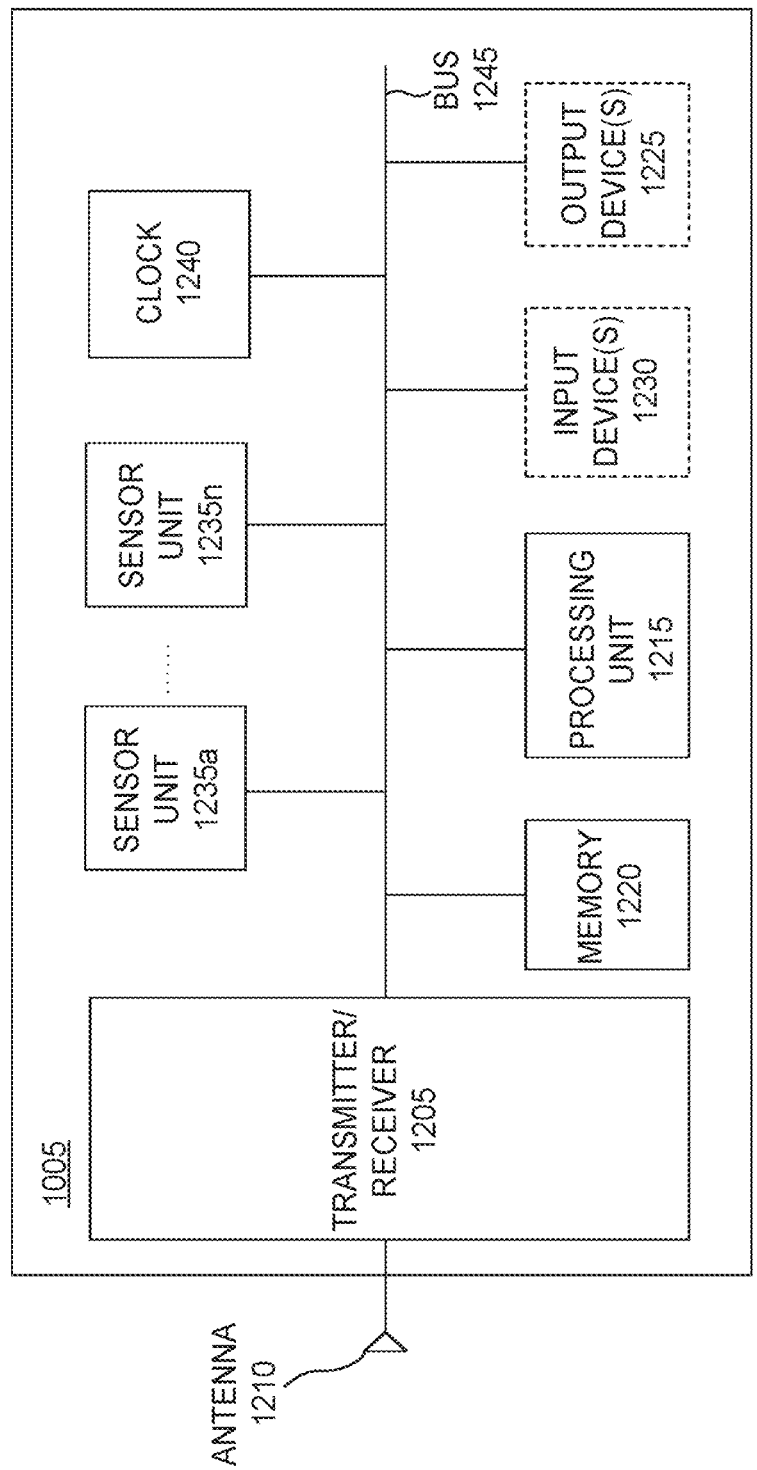
FIG. 12 illustrates exemplary components of a sensor node consistent with the present invention.

FIG. 12 illustrates exemplary components of a sensor node 1005 consistent with the present invention. Sensor node 1005 may include a transmitter/receiver 1205, an antenna 1210, a processing unit 1215, a memory 1220, an optional output device(s) 1225, an optional input device(s) 1230, one or more sensor units 1235*a*-1235*n*, a clock 1240, and a bus 1245.

Transmitter/receiver 1205 may connect sensor node 1005 to a monitor point 905 or another sensor node. For example, transmitter/receiver 1205 may include transmitter and receiver circuitry well known to one skilled in the art for transmitting and/or receiving data bursts via antenna 1210.

Processing unit 1215 may perform all data processing functions for inputting, outputting and processing of data including data buffering and sensor node control functions. Memory 1220 may include random access memory (RAM) and/or read only memory (ROM) that provides permanent, semi-permanent, or temporary working storage of data and instructions for use by processing unit 1215 in performing processing functions. Memory 1220 may also include large-capacity storage devices, such as magnetic and/or optical recording devices. Output device(s) 1225 may include conventional mechanisms for outputting data in video, audio and/or hard copy format. For example, output device(s) 1225 may include a conventional display for displaying sensor measurement data. Input device(s) 1230 may permit entry of data into sensor node 1005. Input device(s) 1230 may include, for example, a touch pad or keyboard.

Sensor units 1235*a*-1235*n* may include one or more of any type of conventional sensing device, such as, for example, acoustic sensors, motion-detection sensors, radar sensors, sensors that detect specific chemicals or families of chemicals, sensors that detect nuclear radiation or sensors that detect biological agents such as anthrax. Each sensor unit 1235*a*-1235*n* may perform one or more measurements over a sampling period and transmit the measured values via packets, cells, datagrams, or the like to monitor points 905*a*-905*n*. Clock 1240 may include conventional circuitry for maintaining a time base to enable the maintenance of a local time at sensor node 1005. Alternatively, sensor node 1005 may derive a local time from an external clock signal, such as, for example, a GPS signal, or from an internal clock synchronized to an external time base.

Bus 1245 may interconnect the various components of sensor node 1005 and permit them to communicate with one another.

Exemplary Monitor Point

FIG. 13 illustrates exemplary components of a monitor point 905 consistent with the present invention. Monitor point 905 may include a transmitter/receiver 1305, an antenna 1310, a processing unit 1315, a memory 1320, an input device(s) 1325, an output device(s) 1330, network interface(s) 1335, a clock 1340, and a bus 1345.

Transmitter/receiver 1305 may connect monitor point 905 to another device, such as another monitor point or one or more sensor nodes. For example, transmitter/receiver 1305 may include transmitter and receiver circuitry well known to one skilled in the art for transmitting and/or receiving data bursts via antenna 1310.

Processing unit 1315 may perform all data processing functions for inputting, outputting, and processing of data. Memory 1320 may include Random Access Memory (RAM) that provides temporary working storage of data and instructions for use by processing unit 1315 in performing processing functions. Memory 1320 may additionally include Read Only Memory (ROM) that provides permanent or semi-permanent storage of data and instructions for use by processing unit 1315. Memory 1320 can also include large-capacity storage devices, such as a magnetic and/or optical device.

Input device(s) 1325 permits entry of data into monitor point 905 and may include a user interface (not shown). Output device(s) 1330 permits the output of data in video, audio, or hard copy format. Network interface(s) 1335 interconnects monitor point 905 with network 915. Clock 1340 may include conventional circuitry for maintaining a time base to enable the maintenance of a local time at monitor point 905. Alternatively, monitor point 905 may derive a local time from an external clock signal, such as, for example, a GPS signal, or from an internal clock synchronized to an external time base.

Bus 1345 interconnects the various components of monitor point 905 to permit the components to communicate with one another.

Exemplary Monitor Point Database

Figure 14A:
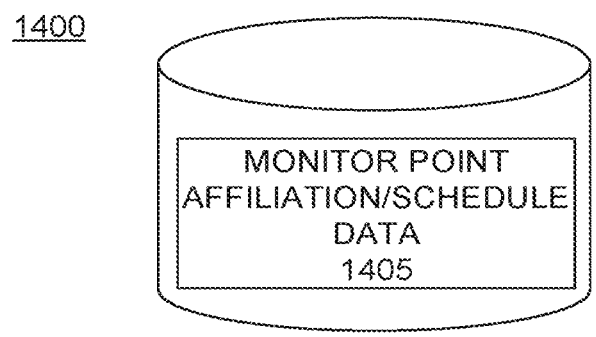
FIG. 14A illustrates an exemplary monitor point database consistent with the present invention.
Figure 14B:
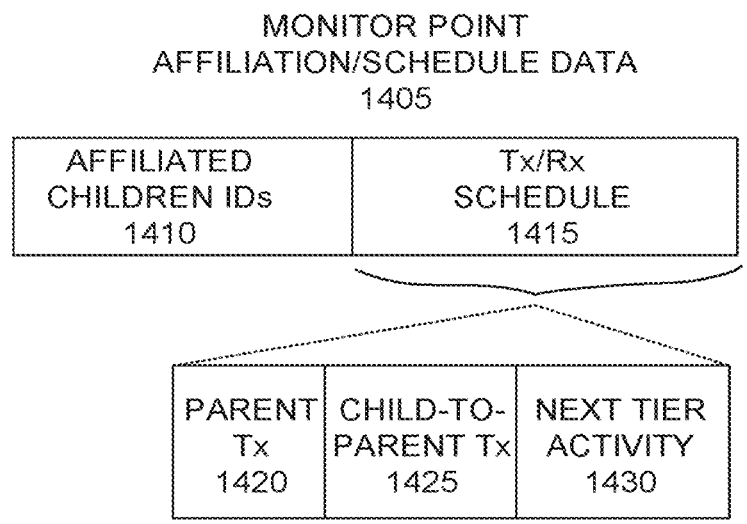
FIG. 14B illustrates exemplary monitor point affiliation/schedule data stored in the database of FIG. 14A consistent with the present invention.

FIG. 14A illustrates an exemplary database 1400 that may be stored in memory 1320 of a monitor point 905. Database 1400 may include monitor point affiliation/schedule data 1405 that includes identifiers of sensor nodes affiliated with monitor point 905, and scheduling data indicating times at which monitor point 905 may transmit to, or receive bursts of data from, affiliated sensor nodes. FIG. 14B illustrates exemplary data that may be contained in monitor point affiliation/schedule data 1405. Monitor point affiliation/schedule data 1405 may include "affiliated children IDs" data 1410 and "Tx/Rx schedule" data 1415. "Tx/Rx schedule" data 1415 may further include "parent Tx" 1420 data, "child-to-parent Tx" data 1425, and "next tier activity" data 1430.

"Affiliated children IDs" data 1410 may include unique identifiers of sensor nodes 1005 that are affiliated with monitor point 905 and, thus, from which monitor point 905 may receive messages. "Parent Tx" data 1420 may include a time at which monitor point 905 may transmit messages to sensor nodes identified by the "affiliated children IDs" data 1410. "Child-to-Parent Tx" data 1425 may include times at which sensor nodes identified by "affiliated children IDs" 1410 may transmit messages to monitor point 905. "Next Tier Activity" data 1430 may include times at which sensor nodes identified by the "affiliated children IDs" data 1410 may transmit messages to, and receive messages from, their affiliated children.

Exemplary Sensor Node Database

Figure 15A:
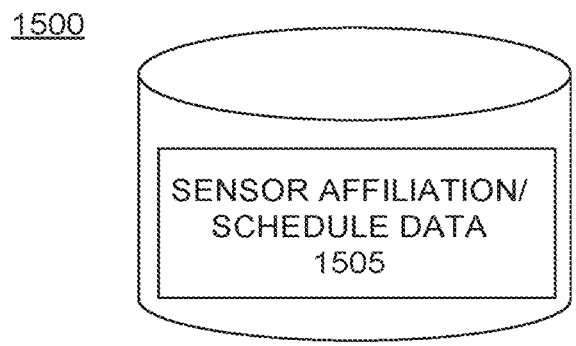
FIG. 15A illustrates an exemplary sensor node database consistent with the present invention.

FIG. 15A illustrates an exemplary database 1500 that may be stored in memory 1220 of a sensor node 1005. Database 1500 may include sensor affiliation/schedule data 1505 that may further include data indicating which sensor nodes are affiliated with sensor node 1005 and indicating schedules for sensor node 1005 to transmit and receive messages.

Figure 15B:
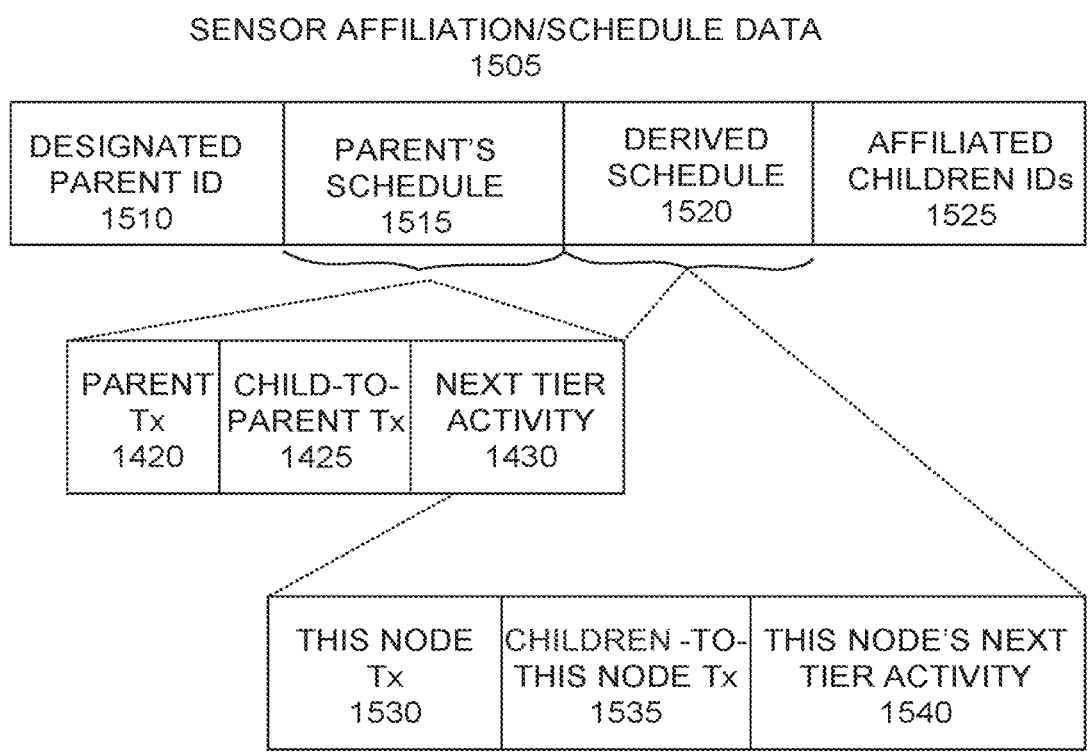
FIG. 15B illustrates exemplary sensor node affiliation/schedule data stored in the database of FIG. 15A consistent with the present invention.

FIG. 15B illustrates exemplary sensor affiliation/schedule data 1505. Sensor affiliation/schedule data 1505 may include "designated parent ID" data 1510, "parent's schedule" data 1515, "derived schedule" data 1520, and "affiliated children IDs" data 1525. "Designated parent ID" data 1510 may include a unique identifier that identifies the "parent" node, in a lower tier of sensor network 910, to which sensor node 1005 forwards messages. "Parent's schedule" data 1515 may further include "parent Tx" data 1420, "child-to-parent Tx" data 1425 and "next tier activity" data 1430. "Derived schedule" data 1520 may further include "this node Tx" data 1530, "children-to-this node Tx" data 1535, and "this node's next tier activity" data 1540. "This node Tx" data 1530 may indicate a time at which sensor node 1005 forwards messages to sensor nodes identified by "affiliated children IDs" data 1525. "Children-to-this node Tx" data 1535 may indicate times at which sensor nodes identified by "affiliated children IDs" data 1525 may forward messages to sensor node 1005. "This node's next tier activity" 1540 may indicate one or more time periods allocated to sensor nodes in the next higher tier for transmitting and receiving messages.

Exemplary Schedule Message

Figure 16:
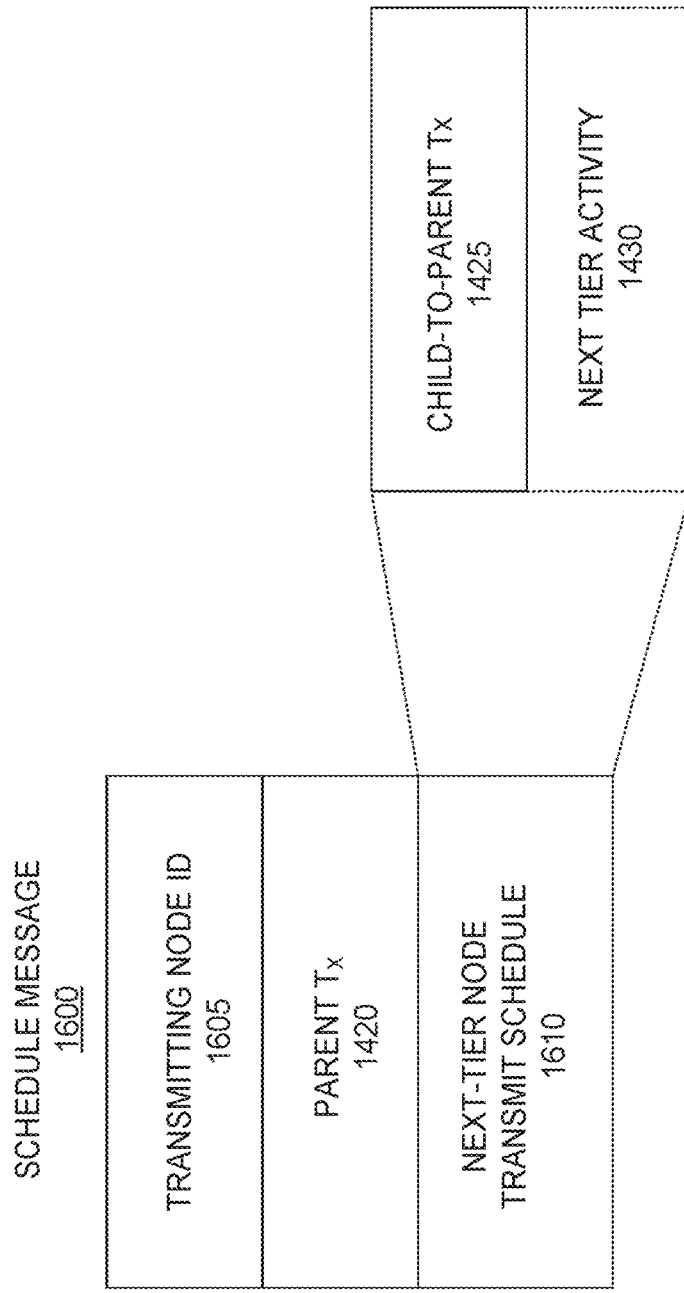
FIG. 16 illustrates an exemplary schedule message consistent with the present invention.

FIG. 16 illustrates an exemplary schedule message 1600 that may be transmitted from a monitor point 905 or sensor node 1005 for scheduling message transmit and receive times within sensor network 910. Schedule message 1600 may include a number of data fields, including "transmitting node ID" data 1605, "parent Tx" data 1420, and "next-tier node transmit schedule" data 1610. "Next-tier node transmit schedule" 1610 may further include "child-to-parent Tx" data 1425 and "next tier activity" data 1430. "Transmitting node ID" data 1605 may include a unique identifier of the monitor point 905 or sensor node 1005 originating the schedule message 1600.

Exemplary Transmit/Receive Scheduling

Figure 17:
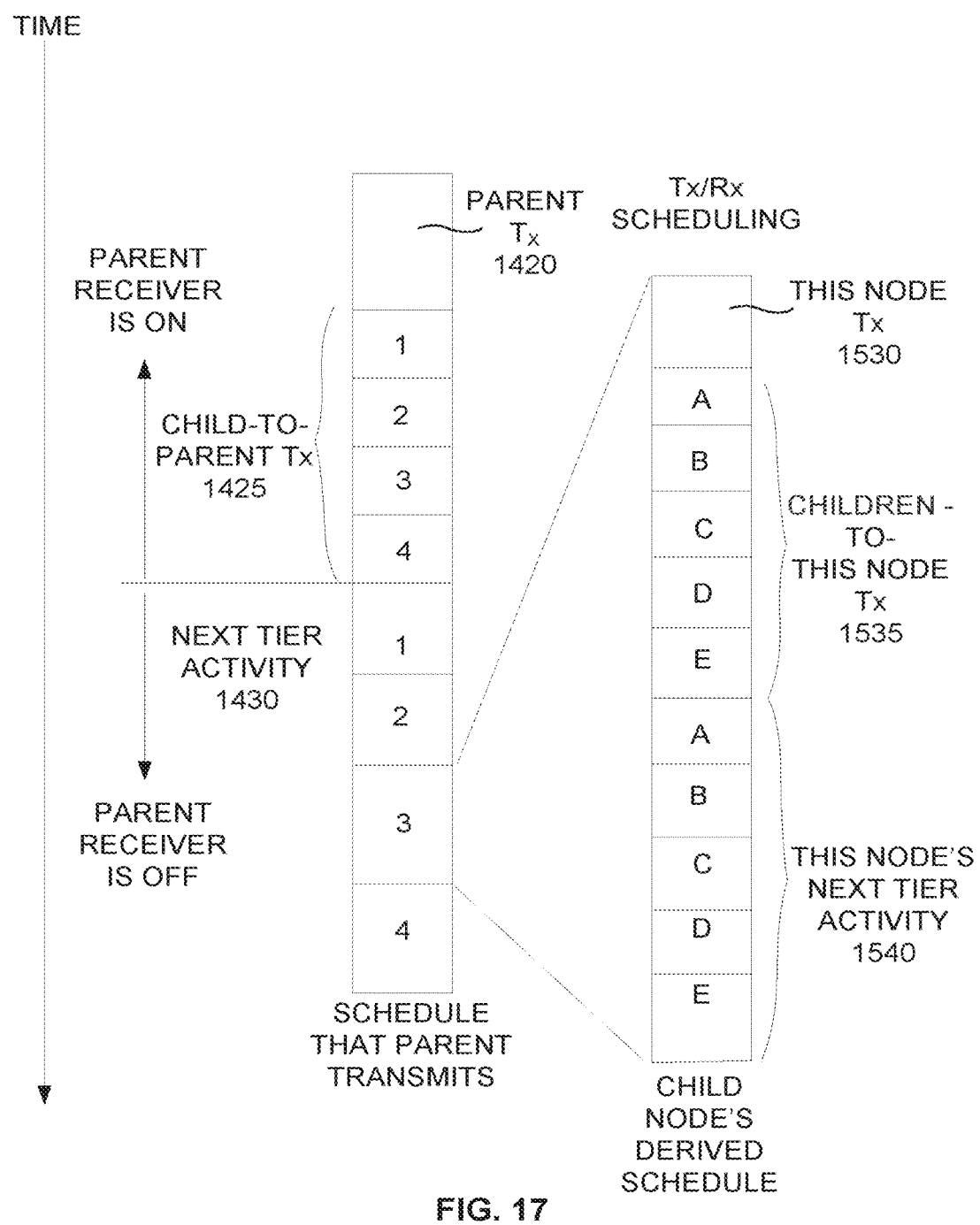
FIG. 17 illustrates exemplary transmit/received scheduling consistent with the present invention.

FIG. 17 illustrates exemplary transmit/receive scheduling that may be employed at each sensor node 1005 of network 910 according to schedule messages 1600 received from "parent" nodes in a lower tier. The first time period shown on the scheduling timeline, Parent Tx data 1420, may include the time period allocated by a "parent" node for transmitting messages from the "parent" node to its affiliated children. The time periods "child-to-parent Tx" 1425 may include time periods allocated to each affiliated child of a parent node for transmitting messages to the parent node. During the "child-to-parent Tx" 1425 time periods, the receiver of the parent node may be turned on to receive messages from the affiliated children.

The "next tier activity" 1430 may include time periods allocated to each child of a parent node for transmitting messages to, and receiving messages from, each child's own children nodes. From the time periods allocated to the children of a parent node, each child may construct its own derived schedule. This derived schedule may include a time period, "this node Tx" 1530 during which the child node may transmit to its own affiliated children. The derived schedule may further include time periods, "children-to-this node Tx" 1535 during which these affiliated children may transmit messages to the parent's child node. The derived schedule may additionally include time periods, designated "this node's next tier activity" 1540, that may be allocated to this node's children so that they may, in turn, construct their own derived schedule for their own affiliated children.

Exemplary Parent/Child Affiliation Processing

Figure 18:
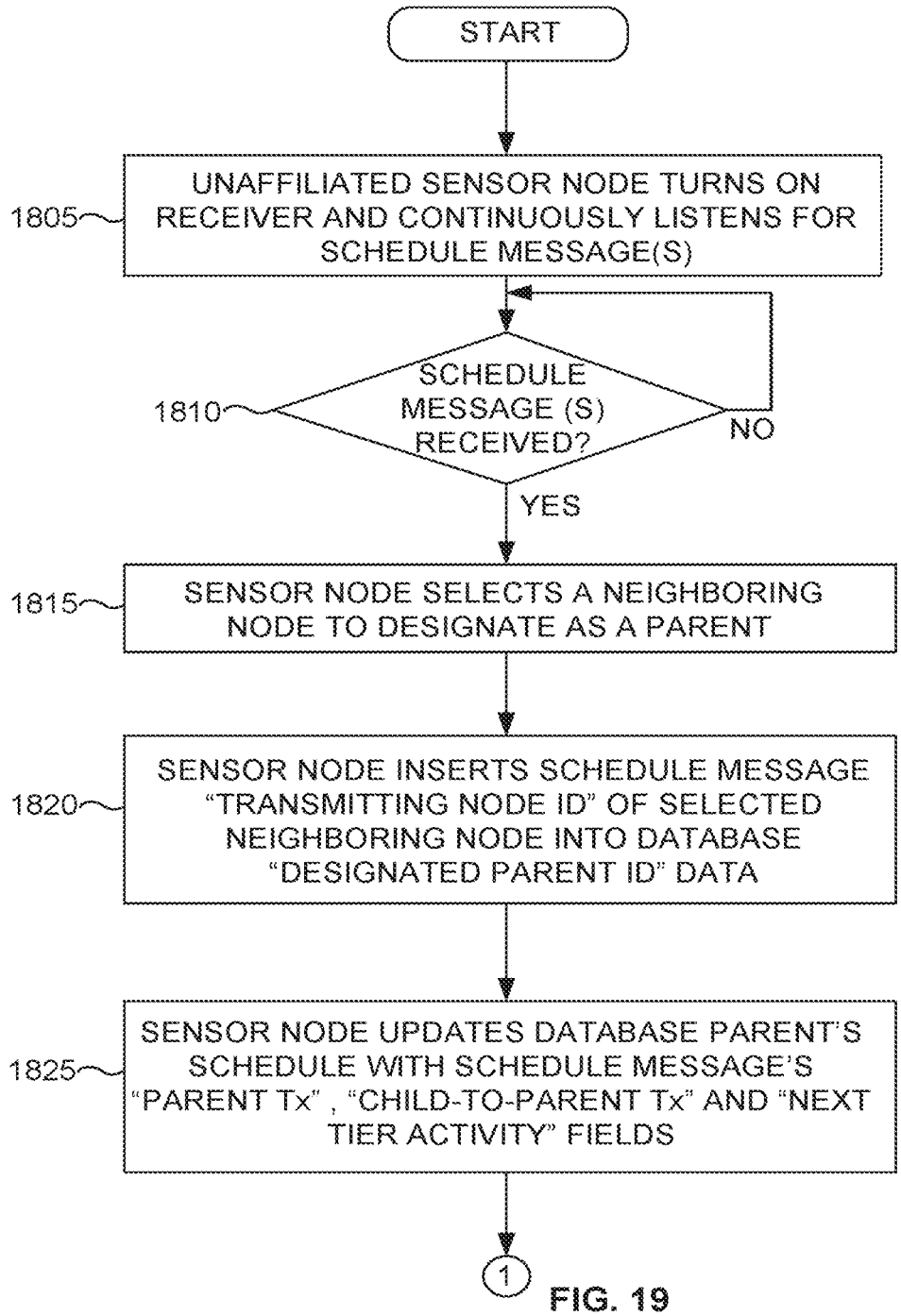
FIGS. 18-19 are flowcharts that illustrate parent/child affiliation processing consistent with the invention.
Figure 19:
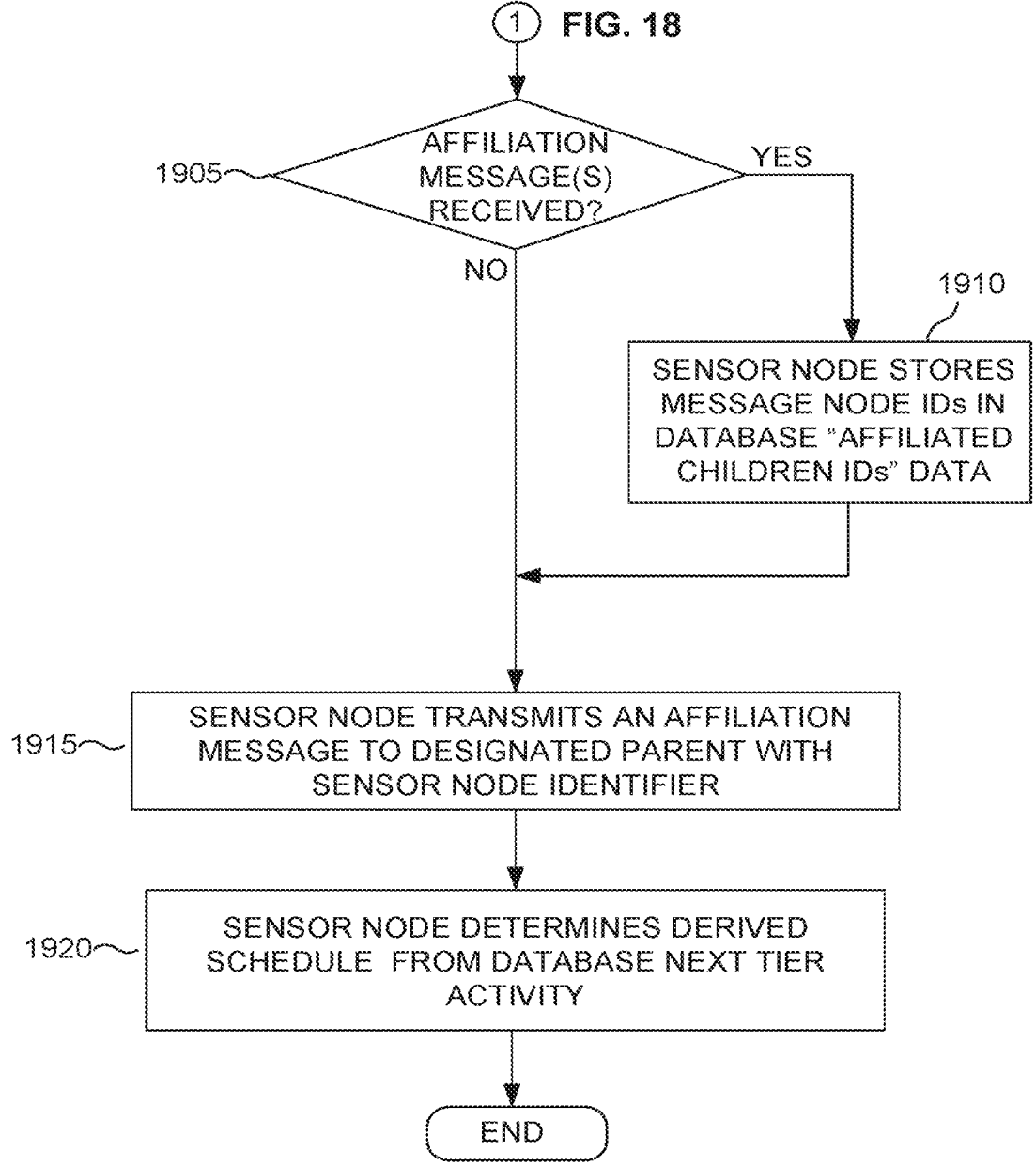

FIGS. 18-19 are flowcharts that illustrate exemplary processing, consistent with the present invention, for affiliating "child" sensor nodes 1005 with "parent" nodes in a lower tier. Such "parent" nodes may include other sensor nodes 1005 in sensor network 910 or monitor points 905. As one skilled in the art will appreciate, the method exemplified by FIGS. 18 and 19 can be implemented as a sequence of instructions and stored in memory 1220 of sensor node 1005 for execution by processing unit 1215.

An unaffiliated sensor node 1005 may begin parent/child affiliation processing by turning on its receiver 1205 and continuously listening for schedule message(s) transmitted from a lower tier of sensor network 910 [step 1805] (FIG. 18). Sensor node 1005 may be unaffiliated with any "parent" node if it has recently been powered on. Sensor node 1005 may also be unaffiliated if it has stopped receiving schedule messages from its "parent" node for a specified time period. If one or more schedule messages are received [step 1810], unaffiliated sensor node 1005 may select a neighboring node to designate as a parent [step 1815]. For example, sensor node 1005 may select a neighboring node whose transmit signal has the greatest strength or the least bit error rate (BER). Sensor node 1005 may insert the "transmitting node ID" data 1605 from the corresponding schedule message 1600 of the selected neighboring node into the "designated parent ID" data 1510 of database 1500 [step 1820]. Sensor node 1005 may then update database 1500's "parent's schedule" data 1515 with "parent Tx" data 1420, "child-to-parent Tx" data 1425, and "next tier activity" data 1430 from the corresponding schedule message 1600 of the selected neighboring node [step 1825].

Sensor node 1005 may determine if any affiliation messages have been received from sensor nodes residing in higher tiers [step 1905] (FIG. 19). If so, sensor node 1005 may store message node identifiers contained in the affiliation messages in database 1500's "affiliation children IDs" data 1525 [step 1910]. Sensor node 1005 may also transmit an affiliation message to the node identified by "designated parent ID" data 1510 in database 1500 [step 1915]. Sensor node 1005 may further determine a derived schedule from the "next tier activity" data 1430 in database 1500 [step 1920] and store in the "derived schedule" data 1520.

Exemplary Monitor Point Message Processing

Figure 20:
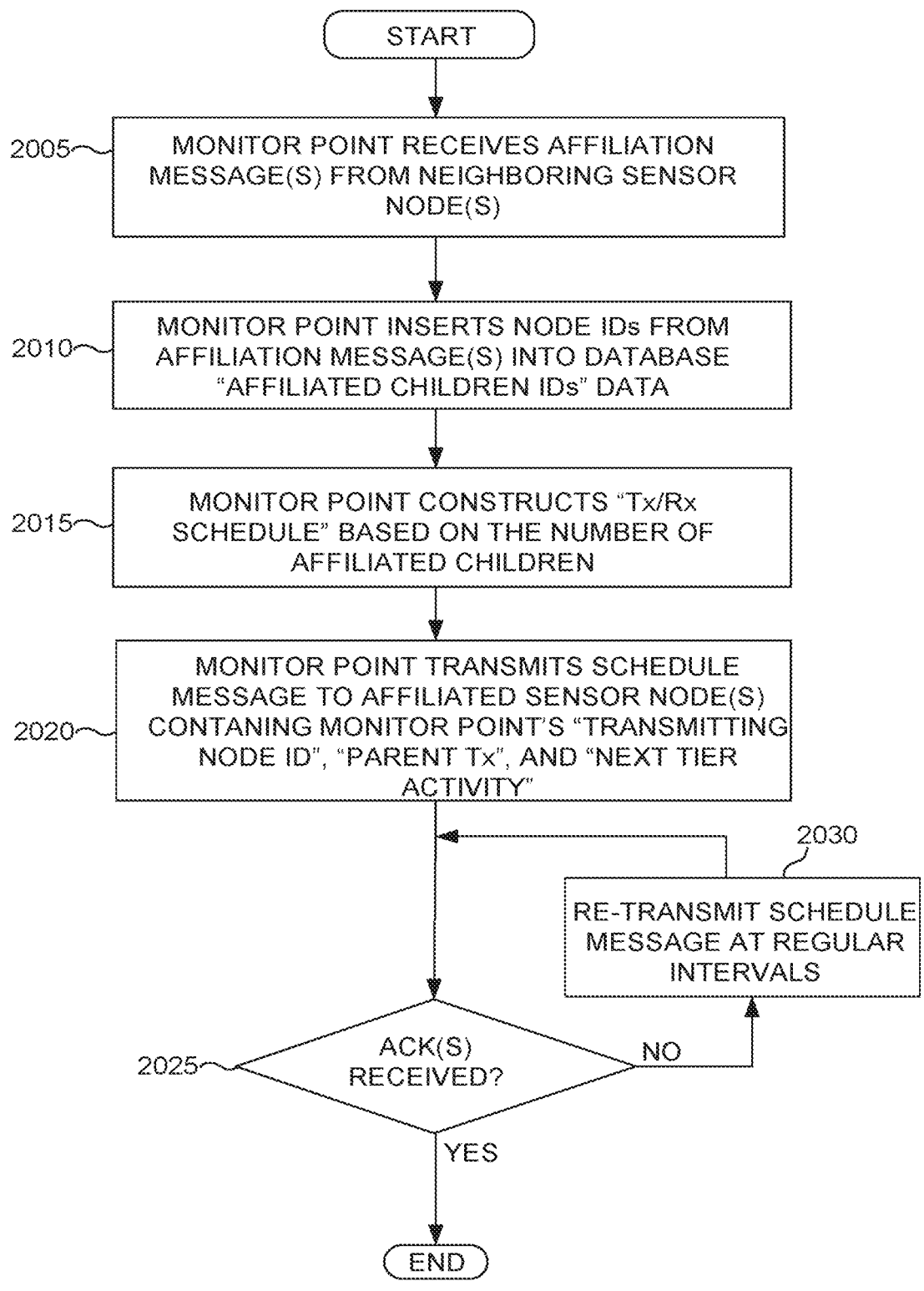
FIG. 20 is a flowchart that illustrates exemplary monitor point scheduling processing consistent with the present invention.
Figure 21:
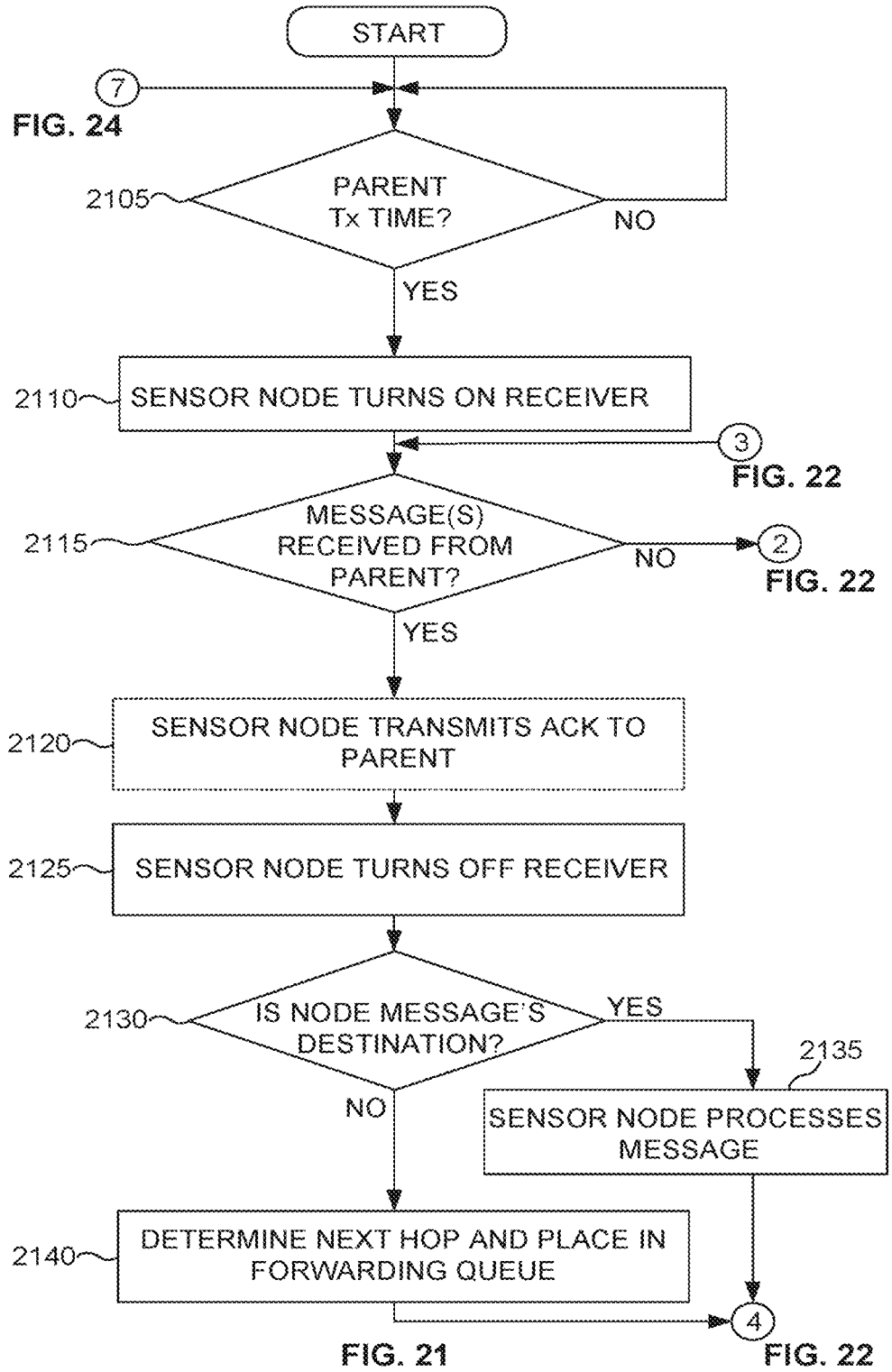
FIG. 21-24 are flowcharts that illustrate sensor node schedule messages processing consistent with the present invention.

FIG. 20 is a flowchart that illustrates exemplary processing, consistent with the present invention, for receiving affiliation messages and transmitting schedule messages at a monitor point 905. As one skilled in the art will appreciate, the method exemplified by FIG. 20 can be implemented as a sequence of instructions and stored in memory 1320 of monitor point 905 for execution by processing unit 1315.

Monitor point message processing may begin with a monitor point 905 receiving one or more affiliation messages from neighboring sensor nodes [step 2005] (FIG. 20). Monitor point 905 may insert the node identifiers from the received affiliation message(s) into database 1400's "affiliation children IDs" data 1410 [step 2010]. Monitor point 905 may construct the "Tx/Rx schedule" 1415 based on the number of affiliated children indicated in "affiliation children IDs" data 1410 [step 2015]. Monitor point 905 may then transmit a schedule message 1600 to sensor nodes identified by "affiliated children IDs" data 1410 containing monitor point 905's "transmitting node ID" data 1605, "parent Tx" data 1420, and "next-tier transmit schedule" data 1610 [step 2020].

Schedule message 1600 may be transmitted periodically using conventional multiple access mechanisms, such as, for example, Carrier Sense Multiple Access (CSMA). Subsequent to transmission of schedule message 1600, monitor point 905 may determine if acknowledgements (ACKs) have been received from all affiliated children [step 2025]. If not, monitor point 905 may re-transmit the schedule message 1600 at regular intervals until ACKs are received from all affiliated children [step 2030]. In this manner, monitor point 905 coordinates and schedules the power on/off intervals of the sensor nodes that is associated with (i.e., the nodes with which it transmits/receives data from).

Exemplary Message Reception/Transmission Processing

FIGS. 21-24 are flowcharts that illustrate exemplary processing, consistent with the present invention, for receiving and/or transmitting messages at a sensor node 1005. As one skilled in the art will appreciate, the method exemplified by FIGS. 21-24 can be implemented as a sequence of instructions and stored in memory 1220 of sensor node 1005 for execution by processing unit 1215. The exemplary reception and transmission of messages at a sensor node 1005 as illustrated in FIGS. 21-24 is further demonstrated with respect to the exemplary messages transmission diagram illustrated in FIG. 24.

Figure 22:
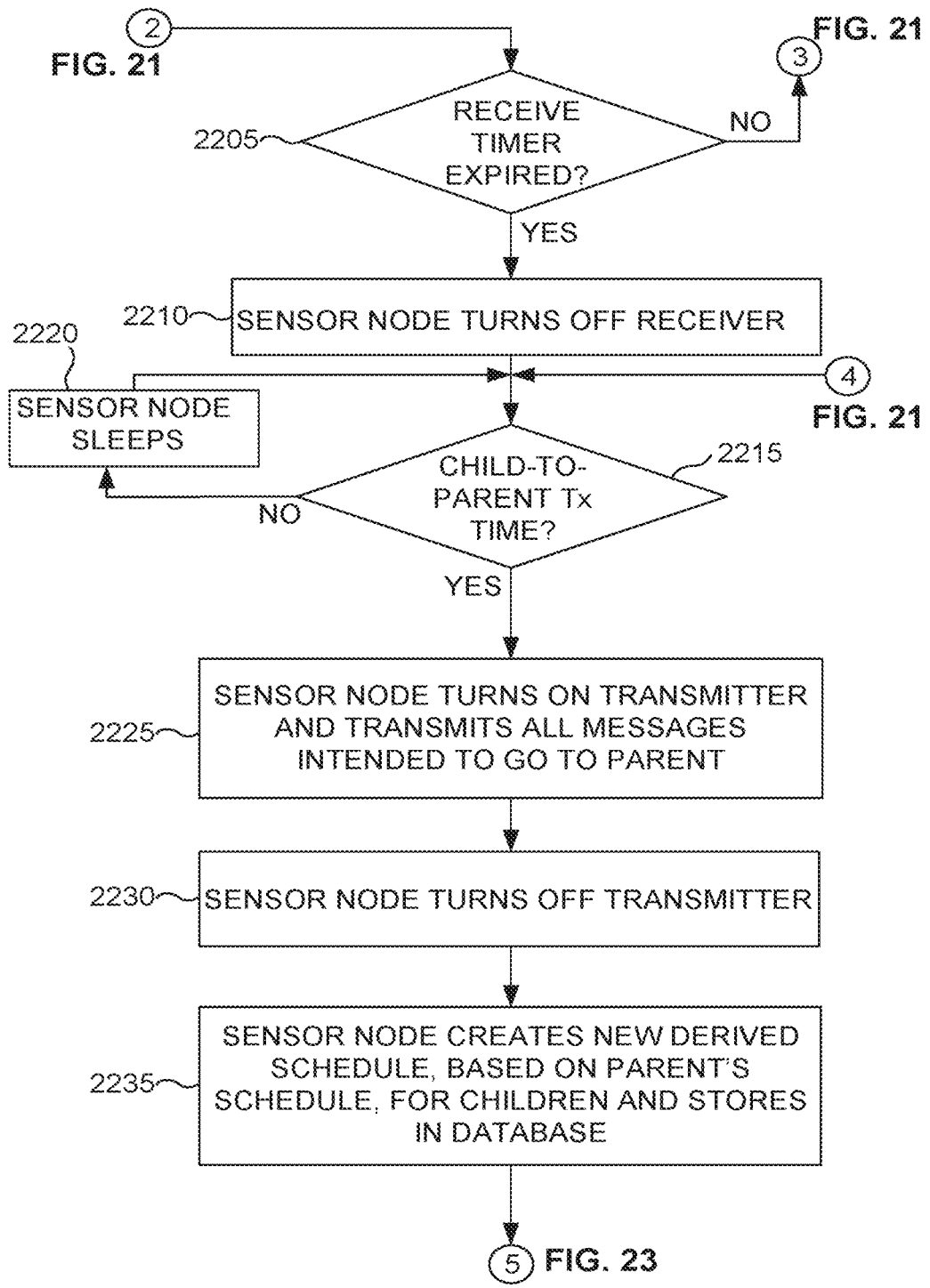
Figure 25:
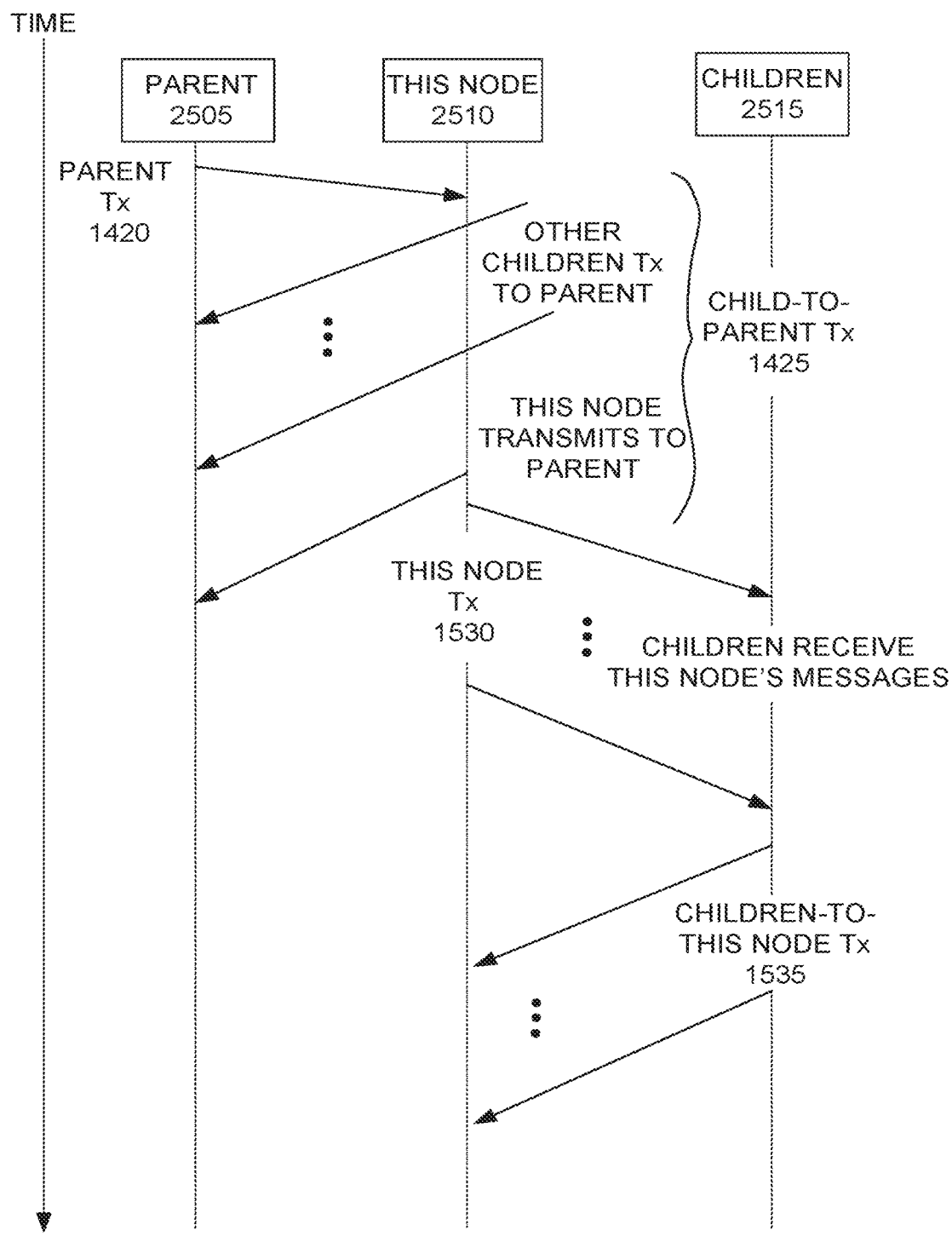
FIG. 25 illustrates an exemplary message transmission diagram consistent with the present invention.

Sensor node 1005 ("This node" 2510 of FIG. 25) may begin processing by determining if it is the next parent transmit time as indicated by clock 1240 and the "parent Tx" data 1420 of database 1500 [step 2105]. If so, sensor node 1005 may turn on receiver 1205 [step 2110] (FIG. 21) and listen for messages transmitted from a parent (see also "Parent Node" 2505 of FIG. 25). If no messages are received, sensor node 1005 determines if a receive timer has expired [step 2205] (FIG. 22). The receive timer may indicate a maximum time period that sensor node 1005 (see "This Node" 2510 of FIG. 25) may listen for messages before turning off receiver 1205. If the receive timer has not expired, processing may return to step 2115. If the receive timer has expired, sensor node 1005 may turn off receiver 1205 [step 2210]. If messages have been received (see "Parent TX" 1420 of FIG. 25), sensor node 1005 may, optionally, transmit an ACK to the parent node that transmitted the messages [step 2120]. Sensor node 1005 may then turn off receiver 1205 [step 2125].

Inspecting the received messages, sensor node 1005 may determine if sensor node 1005 is the destination of each of the received messages [step 2130]. If so, sensor node 1005 may process the message [step 2135]. If not, sensor node 1005 may determine a next hop in sensor network 910 for the message using conventional routing tables, and place the message in a forwarding queue [step 2140]. At step 2215, sensor node 1005 may determine if it is time to transmit messages to the parent node as indicated by "child-to-parent Tx" data 1425 of database 1500 (see "child-to-parent Tx" 1425 of FIG. 25). If not, sensor node 1005 may sleep until clock 1240 indicates that it is time to transmit messages to the parent node [step 2220]. If clock 1240 and "child-to-parent Tx" data 1425 indicate that it is time to transmit messages to the parent node, sensor node 1005 may turn on transmitter 1205 and transmit all messages intended to go to the node indicated by the "designated parent ID" data 1510 of database 1500 [step 2225]. Mter all messages are transmitted to the parent node, sensor node 1005 may turn off transmitter 1205 [step 2230].

Figure 23:
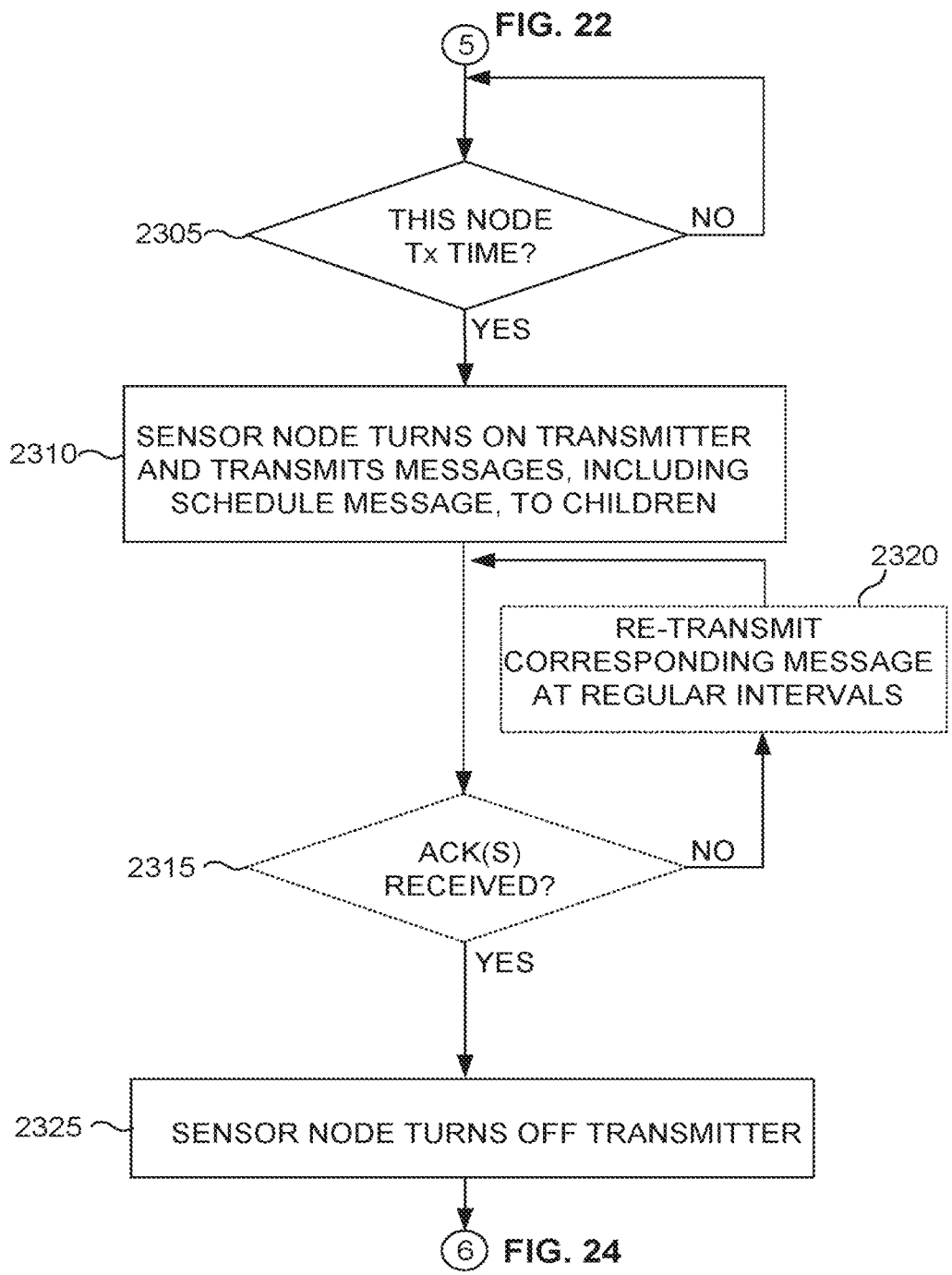
Figure 24:
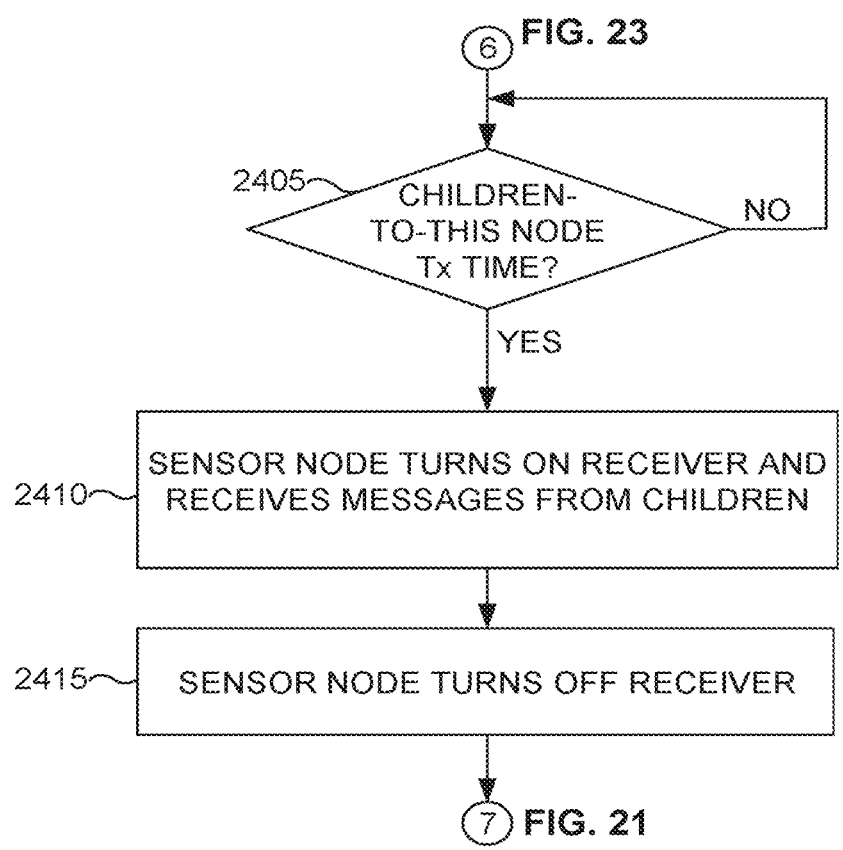

Sensor node 1005 may create a new derived schedule for it's children identified by "affiliated children IDs" data 1525, based on the "parent's schedule" 1515, and may then store the new derived schedule in the "derived schedule" data 1520 of database 1500 [step 2235]. Sensor node 1005 may inspect the "this node Tx" data 1530 of database 1500 to determine if it is time to transmit to the sensor nodes identified by the "affiliated children IDs" data 1525 [step 2305] (FIG. 23). If so, sensor node 1005 may turn on transmitter 1205 and transmit messages, including schedule messages, to its children [step 2310] (see "This Node Tx" 1530, FIG. 25). For each transmitted message, sensor node 1005 may, optionally, determine if an ACK is received [step 2315]. If not, sensor node 1005 may further, optionally, re-transmit the corresponding message at a regular interval until an ACK is received [step 2320]. When all ACKs are received, sensor node 1005 may turn off transmitter 1205 [step 2325]. Sensor node 1005 may then determine if it is time for its children to transmit to sensor node 1005 as indicated by clock 1240 and "children-to-this node Tx" data 1535 of database 1500 [step 2405] (FIG. 24). If so, sensor node 1005 may turn on receiver 1205 and receive one or messages from the children identified by the "affiliated children IDs" data 1525 of database 1500 [step 2410] (see "Children-to-this Node Tx" 1535, FIG. 25). Sensor node 1005 may then turn off receiver 1205 [step 2415] and processing may return to step 2105 (FIG. 21). In this manner, sensor nodes may power on and off their transmitters and receivers at appropriate times to conserve energy, while still performing their intended functions in network 900.

Exemplary Receiver Timing

Figure 26:
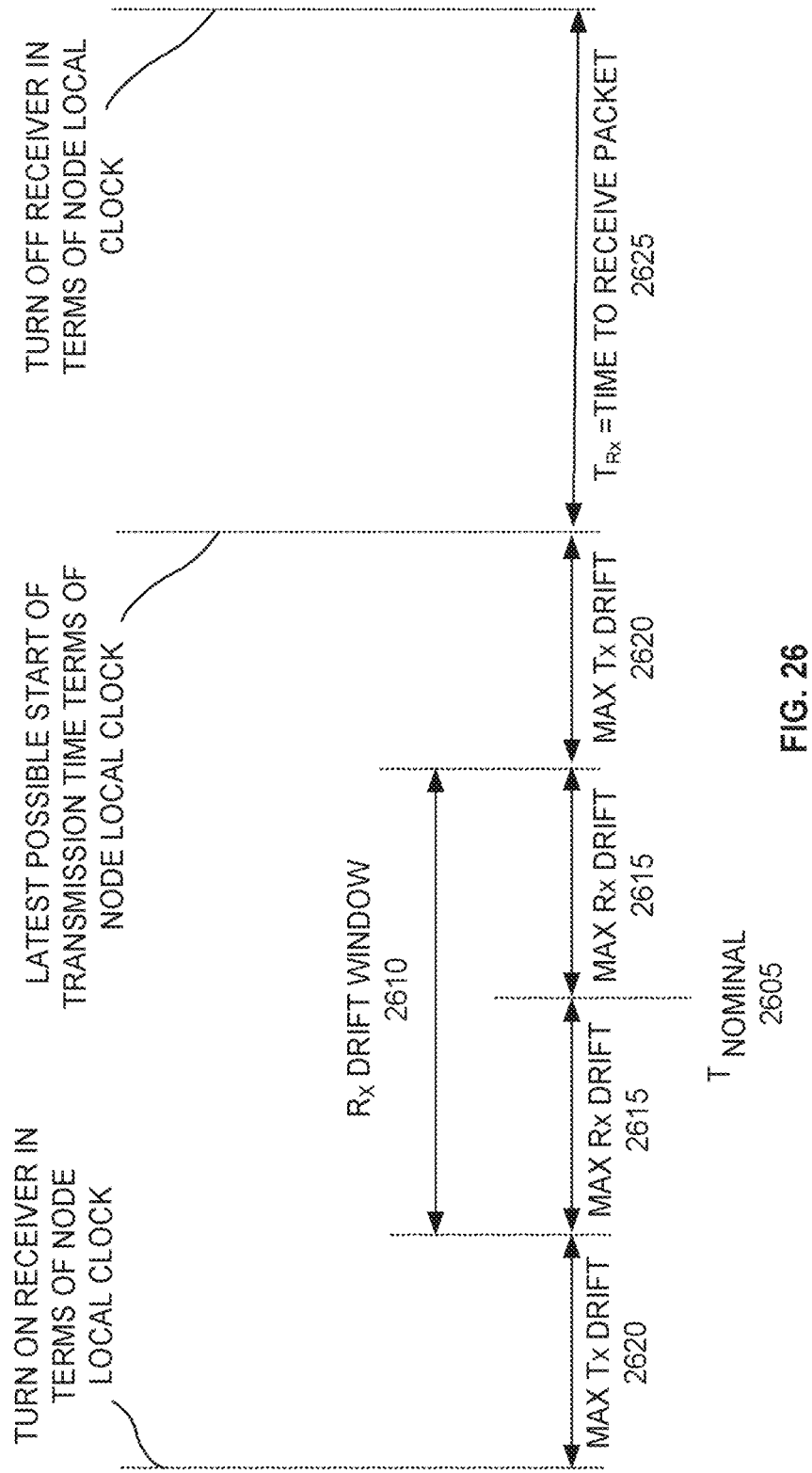
FIG. 26 illustrates exemplary node receiver timing consistent with present invention.

FIG. 24 illustrates exemplary receiver timing when monitor points 905 or sensor nodes 1005 of sensor network 910 use internal clocks that may have inherent "clock drift." "Clock drift" occurs when internal clocks runs faster or slower then the true elapsed time and may be inherent in many types of internal clocks employed in monitor points 905 or sensor nodes 1005. "Clock drift" may be taken into account when scheduling the time at which a node's receiver must be turned on, since both the transmitting node and the receiving node may both have drifting clocks. As shown in FIG. 26, $T_{nominal}$ 2605 represents the next time at which a receiver must be turned on based on scheduling data contained in the schedule message received from a parent node. A "Rx Drift Window" 2610 exists around this time which represents $T_{nominal}$ plus or minus the "Max Rx Drift" 2615 for this node over the amount of time remaining until $T_{nominal}$. If the transmitting node has zero clock drift, the receiving node should, thus, wake up at the beginning of its "Rx Drift Window" 2610.

The clock at the transmitting node may also incur clock drift, "Max Tx Drift" 2620, that must be accounted for at the receiving node when turning on and off the receiver. The receiving node should, thus, turn on its receiver at a local clock time that is "Max Tx Drift" 2620 plus "Max Rx Drift" 2615 before $T_{nominal}$. The receiving node should also turn off its receiver at a local clock time that is "Max Rx Drift" 2615 plus "Max Tx Drift" 2620 plus a maximum estimated time to receive a packet from the transmitting node ($T_{Rx}$ 2625). $T_{Rx}$ 2625 may include packet transmission time and packet propagation time. By taking into account maximum estimated clock drift at both the receiving node and transmitting node, monitor points 905 and sensor nodes 1005 of sensor network 910 may successfully implement transmit/receive scheduling as described above with respect to FIGS. 9-25.

Systems and methods consistent with the present invention, therefore, provide mechanisms that enable sensor node transmitters and receivers to be turned off, and remain in a "sleep" state, for substantial periods, thus, increasing the energy efficiency of the nodes. Systems and methods consistent with the present invention further implement transmission and reception schedules that permit the reception and forwarding of packets containing routing, or other types of data, during short periods when the sensor node transmitters and receivers are powered up and, thus, "awake." The present invention, thus, increases sensor node operational life by reducing energy consumption while permitting the reception and forwarding of the routing messages needed to self-organize the distributed network. The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other hardware/software configurations may be possible. Also, while series of steps have been described with regard to FIGS. 18-24, the order of the steps is not critical.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4, 5 and 6, the order of the acts can be varied in other implementations consistent with the present invention. Moreover, non-dependent acts can be implemented in parallel.

No element, act, or instruction used in the description of the present invention should be construed as critical or essential to the invention unless explicitly described as such. Also, as used herein, the article "a" is intended to include one or more items. Where only one item is intended, the term "one" or similar language is used. The scope of the invention is not limited to the foregoing description, and is instead defined by the claims and their equivalents.

What is claimed:

1. A wireless device comprising:
   a transceiver; and
   a processor operatively coupled to the transceiver, wherein:
   the transceiver and the processor are configured to receive scheduling information at predetermined time intervals from a wireless node of a plurality of wireless nodes in a wireless network, the scheduling information including a plurality of reception definitions,
      wherein the scheduling information is received periodically and the wireless device sleeps between each receipt of the periodically received scheduling information,
      wherein the plurality of reception definitions have differing numbers of fields including at least one error correction field,
      wherein each reception definition of the plurality of reception definitions includes an indication of a reception start time, an indication of a reception duration, and an indication of assigned frequencies, and
      wherein each reception definition is derived from a wireless device identification associated with that reception definition; and
   the transceiver and the processor are further configured to, in response information in the fields of one of the reception definitions, and in response to using the at least one error correction field, receive and process data at the indicated reception start time for the indicated reception duration and at the assigned frequencies from the wireless node.

2. The wireless device of claim 1, wherein the received and processed data was received using frequency hopping.

3. The wireless device of claim 1, wherein the processor and the transceiver are further configured to receive transmission scheduling information from the wireless node for the wireless device to transmit to another wireless device.

4. The wireless device of claim 3, wherein the processor and the transceiver are further configured to transmit to the another wireless device based on the received transmission scheduling information.

5. The wireless device of claim 3, wherein the transmission to the other wireless device includes sensor data.

6. The wireless device of claim 1, wherein the scheduling information includes transmission scheduling data in addition to the plurality of reception definitions.

7. The wireless device of claim 1, wherein the indication of assigned frequencies includes an indication of a carrier frequency.

8. The wireless device of claim 1, wherein each reception definition includes an error correction field.

9. A method comprising:
   receiving, by a wireless device, scheduling information at predetermined time intervals from a wireless node of a plurality of wireless nodes in a wireless network, the scheduling information including a plurality of reception definitions,
      wherein the scheduling information is received periodically and the wireless device sleeps between each receipt of the periodically received scheduling information,
      wherein the plurality of reception definitions have differing numbers of fields including at least one error correction field,
      wherein each reception definition of the plurality of reception definitions includes an indication of a reception start time, an indication of a reception duration, and an indication of assigned frequencies, and
      wherein each reception definition is derived from a wireless device identification associated with that reception definition; and
   in response to information in the fields of one of the reception definitions, and in response to using the at least one error correction field, receiving and processing, by the wireless device, data at the indicated reception start time for the indicated reception duration and at the assigned frequencies from the wireless node.

10. The method of claim 9, wherein the received and processed data was received using frequency hopping.

11. The method of claim 9, further comprising receiving, by the wireless device, transmission scheduling information from the wireless node for the wireless device to transmit to another wireless device.

12. The method of claim 11, further comprising transmitting, by the wireless device, to the another wireless device based on the received transmission scheduling information.

13. The method of claim 11, wherein the transmission to the other wireless device includes sensor data.

14. The method of claim 9, wherein the scheduling information includes transmission scheduling data in addition to the plurality of reception definitions.

15. The method of claim 9, wherein the indication of assigned frequencies includes an indication of a carrier frequency.

16. The method of claim 9, wherein each reception definition includes an error correction field.

\* \* \* \* \*